US010075270B2

(12) United States Patent
Yerramalli et al.

(10) Patent No.: US 10,075,270 B2
(45) Date of Patent: Sep. 11, 2018

(54) TECHNIQUES FOR CELL-SPECIFIC REFERENCE SIGNAL (CRS)-BASED SIGNALING IN A SHARED RADIO FREQUENCY SPECTRUM BAND

(71) Applicant: QUALCOMM Incorporated, San Diego, CA (US)

(72) Inventors: Srinivas Yerramalli, San Diego, CA (US); Tao Luo, San Diego, CA (US); Durga Prasad Malladi, San Diego, CA (US); Yongbin Wei, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 147 days.

(21) Appl. No.: 14/864,056

(22) Filed: Sep. 24, 2015

(65) Prior Publication Data

US 2016/0112169 A1    Apr. 21, 2016

Related U.S. Application Data

(60) Provisional application No. 62/064,711, filed on Oct. 16, 2014.

(51) Int. Cl.
*H04L 5/00* (2006.01)
*H04L 1/18* (2006.01)
(Continued)

(52) U.S. Cl.
CPC .......... *H04L 5/0048* (2013.01); *H04L 1/1822* (2013.01); *H04L 5/001* (2013.01);
(Continued)

(58) Field of Classification Search
None
See application file for complete search history.

(56) References Cited

U.S. PATENT DOCUMENTS

2009/0196359 A1* 8/2009 Magee ................... H04L 5/003
375/260
2011/0243090 A1* 10/2011 Grovlen .................. H04L 1/18
370/329

(Continued)

OTHER PUBLICATIONS

IPEA/EP, Second Written Opinion of the International Preliminary Examining Authority, Int'l Application No. PCT/US2015/052183, dated Sep. 21, 2016, European Patent Office, Rijswijk, NL, 9 pgs.

(Continued)

*Primary Examiner* — Charles C Jiang
*Assistant Examiner* — Saad Khawar
(74) *Attorney, Agent, or Firm* — Clint R. Morin; Holland & Hart

(57) ABSTRACT

Techniques are described for wireless communication. A first method includes identifying a configuration of a downlink subframe in a shared radio frequency spectrum band, and generating, based at least in part on the configuration of the downlink subframe, a cell-specific reference signal (CRS) for the downlink subframe. A second method includes dynamically determining a presence of a CRS in a downlink subframe in a shared radio frequency spectrum band, and performing at least one operation during the downlink subframe in response to the dynamic determination.

28 Claims, 21 Drawing Sheets

(51) Int. Cl.
   *H04W 72/04* (2009.01)
   *H04W 24/08* (2009.01)
   *H04L 27/00* (2006.01)

(52) U.S. Cl.
   CPC ............ *H04L 5/005* (2013.01); *H04W 24/08* (2013.01); *H04W 72/042* (2013.01); *H04L 5/0035* (2013.01); *H04L 27/0006* (2013.01)

(56) References Cited

U.S. PATENT DOCUMENTS

| | | | |
|---|---|---|---|
| 2012/0140726 A1* | 6/2012 | Moon | H04B 7/155 370/329 |
| 2014/0064204 A1* | 3/2014 | Seo | H04L 5/0035 370/329 |
| 2014/0071930 A1* | 3/2014 | Lee | H04W 74/0833 370/329 |
| 2015/0016239 A1* | 1/2015 | Yi | H04J 11/003 370/201 |
| 2015/0103800 A1* | 4/2015 | Seo | H04W 56/00 370/330 |
| 2015/0139093 A1* | 5/2015 | Seo | H04L 5/0053 370/329 |
| 2015/0146622 A1* | 5/2015 | Ren | H04L 5/005 370/328 |
| 2015/0245346 A1* | 8/2015 | Yokomakura | H04W 24/10 370/329 |
| 2016/0212786 A1* | 7/2016 | Hwang | H04B 7/2656 |
| 2016/0278030 A1* | 9/2016 | Yi | H04W 16/32 |
| 2016/0301502 A1* | 10/2016 | Cheng | H04L 5/0094 |
| 2017/0094528 A1* | 3/2017 | Takeda | H04W 16/14 |

OTHER PUBLICATIONS

Ericsson, "On Transition Time Reduction for Small Cell On/Off," 3GPP TSG RAN WG1 Meeting #76bis, R1-141640, Shenzhen, China, Mar. 31-Feb. 4, 2014, 6 pgs., 3rd Generation Partnership Project.

ISA/EPO, International Search Report and Written Opinion of the International Searching Authority, Int'l. App. No. PCT/US2015/052183, Dec. 17, 2015, European Patent Office, Rijswijk, NL, 12 pgs.

Motorola Mobility, "Physical Layer Options for LAA-LTE," 3GPP TSG RAN WG1 #78bis, R1-144236, Ljubljana, Slovenia, Oct. 6-10, 2014, 2 pgs., 3rd Generation Partnership Project.

Nvidia, "Details of Discovery Signal Design," 3GPP TSG-RAN WG1 #77, R1-142311, Seoul, Korea, May 19-23, 2014, 5 pgs., 3rd Generation Partnership Project.

Sharp, "On the Design of the Discovery Signal," 3GPP TSG RAN WG1 #77, R1-142200, Seoul, Korea, May 19-23, 2014, 6 pgs., 3rd Generation Partnership Project.

* cited by examiner

TECHNIQUES FOR CELL-SPECIFIC REFERENCE SIGNAL (CRS)-BASED SIGNALING IN A SHARED RADIO FREQUENCY SPECTRUM BAND

CROSS REFERENCES

The present application for patent claims priority to U.S. Provisional Patent Application No. 62/064,711 by Yerramalli et al., entitled "Techniques for Cell-Specific Reference Signal (CRS)-Based Signaling in a Shared Radio Frequency Spectrum Band," filed Oct. 16, 2014, assigned to the assignee hereof, and which is hereby incorporated by reference in its entirety.

BACKGROUND

Field of the Disclosure

The present disclosure, for example, relates to wireless communication systems, and more particularly to techniques for cell-specific reference signal (CRS)-based signaling in a shared radio frequency spectrum band.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, single-carrier frequency-division multiple access (SC-FDMA) systems, and orthogonal frequency-division multiple access (OFDMA) systems.

By way of example, a wireless multiple-access communication system may include a number of base stations, each simultaneously supporting communication for multiple communication devices, otherwise known as user equipments (UEs). A base station may communicate with UEs on downlink channels (e.g., for transmissions from a base station to a UE) and uplink channels (e.g., for transmissions from a UE to a base station).

Some modes of communication may enable communications between a base station and a UE in a shared radio frequency spectrum band, or in different radio frequency spectrum bands (e.g., a dedicated radio frequency spectrum band and a shared radio frequency spectrum band) of a cellular network. With increasing data traffic in cellular networks that use a dedicated (e.g., licensed) radio frequency spectrum band, offloading of at least some data traffic to a shared radio frequency spectrum band may provide a cellular operator with opportunities for enhanced data transmission capacity. A shared radio frequency spectrum band may also provide service in areas where access to a dedicated radio frequency spectrum band is unavailable.

Prior to gaining access to, and communicating over, a shared radio frequency spectrum band, a base station or UE may perform a listen before talk (LBT) procedure to contend for access to the shared radio frequency spectrum band. An LBT procedure may include performing a clear channel assessment (CCA) procedure to determine whether a channel of the shared radio frequency spectrum band is available. When it is determined that the channel of the shared radio frequency spectrum band is available, a channel usage beacon signal (CUBS) may be transmitted to reserve the channel.

When a base station communicates with a number of UEs in a dedicated radio frequency spectrum band using Long Term Evolution (LTE) communications or LTE-Advanced (LTE-A) communications, the base station may transmit a CRS during every downlink subframe, and the number of UEs may receive a CRS during every downlink subframe. Each CRS may be used for various CRS-based operations at one or more of the UEs. When a base station communicates with a number of UEs in a shared radio frequency spectrum band, the base station may not be able to transmit a CRS during every downlink subframe. In addition, one or more of the UEs may not be able to receive a CRS during every downlink subframe. This may be the result of the shared radio frequency spectrum being unavailable to the base station and to each of the UEs during every subframe.

SUMMARY

The present disclosure, for example, relates to one or more techniques for CRS-based signaling in a shared radio frequency spectrum band. Because a shared radio frequency spectrum band may not be available to a base station and a UE for purposes of transmitting and receiving a CRS during every downlink subframe, one technique for transmitting CRSs in a shared radio frequency spectrum band is to limit such transmissions to relatively sparse downlink CCA-exempt subframes (i.e., subframes in which the base station may transmit in the shared radio frequency spectrum band without first performing a CCA and winning contention for access to the shared radio frequency spectrum band, which may occur, for example, once every 80 milliseconds). Another technique is to limit CRS transmissions to a relatively sparse number of CCA subframes that occur on a periodic basis (i.e., subframes in which the base station may only transmit after winning contention for access to the shared radio frequency spectrum band during the subframe, which may occur, for example, once every 20 milliseconds assuming CCAs are successful). A UE may then be programmed to decode a CRS in each downlink CCA-exempt subframe, and in each of the periodic number of CCA subframes for which the UE wins contention for access to the shared radio frequency spectrum band. In some examples, a base station may be programmed to transmit a CRS during every downlink subframe for which the base station wins contention to access the shared radio frequency spectrum band. When a base station has the potential to transmit a CRS in every downlink subframe, the UEs with which it communicates may be programmed to decode a CRS in every downlink subframe. However, programming a UE to decode a CRS in every downlink subframe may be a poor use of resources and UE power, given that a base station's CCA success rate may be poor under some scenarios and given that the CCA success rates of the UEs may vary from UE-to-UE.

When CRSs are transmitted less often, or at fixed periodic intervals, CRS-based signaling may be limited. For example, a base station may be unable to transmit a CRS-based transmission, or a UE may be unable to perform a CRS-based operation. Other techniques for transmitting CRSs in a shared radio frequency spectrum band are therefore described in the present disclosure. From the perspective of a base station, the techniques may include generating a CRS for a downlink subframe in a shared radio frequency spectrum band based at least in part on the configuration of the downlink subframe, thereby enabling, for example, the transmission of a CRS-based transmission during any downlink subframe. From the perspective of a UE, the techniques may include dynamically determining a presence of a CRS in a downlink subframe in a shared radio frequency spectrum band, thereby enabling, for example, the performance of a CRS-based operation when a CRS is present.

In an example, a method for wireless communication is described. In one configuration, the method may include identifying a configuration of a downlink subframe in a shared radio frequency spectrum band, and generating, based at least in part on the configuration of the downlink subframe, a CRS for the downlink subframe.

In some examples, the method may include signaling a presence of the CRS in the downlink subframe. In some examples, signaling the presence of the CRS may include signaling the presence of the CRS in downlink control information (DCI) included in a physical downlink control channel (PDCCH) or an enhanced PDCCH (ePDCCH) on a first carrier in the shared radio frequency spectrum, and transmitting the signaling on a licensed carrier in the shared radio frequency spectrum or an unlicensed carrier in the shared radio frequency spectrum band, where the licensed carrier and unlicensed carrier are different from the first carrier.

In some examples, the method may include transmitting, in a first set of at least one symbol period including a first symbol period of the downlink subframe, a control region including a physical control format indicator channel (PCFICH), a physical frame format indicator channel (PFFICH), a PDCCH, or a physical hybrid automatic repeat request indicator channel (PHICH), and transmitting the CRS in the first symbol period of the downlink subframe. In some examples, the first set of at least one symbol period may include at least a second symbol period of the downlink subframe, and the control region may be further transmitted in at least the second symbol period of the downlink subframe. In some examples, the method may include increasing an aggregation level in at least the second symbol period to satisfy a minimum bandwidth occupancy, or transmitting a filler symbol over at least one tone in at least the second symbol period to satisfy a minimum bandwidth occupancy. In some examples, the filler symbol may include a symbol that is decodable or usable by a UE. In other examples, the filler symbol may include a junk symbol that is not decodable or not usable by a UE. In some examples, the method may include boosting a transmit power in the at least second symbol period to maintain a constant transmit power from the first symbol period to the at least second symbol period. In some examples, boosting the transmit power may include transmitting a filler symbol over at least one tone in at least the second symbol period. In some examples, the method may include transmitting, in a second set of at least one symbol period following the first set of at least one symbol period, a data region, and boosting a transmit power in at least one symbol period in the first set to maintain a constant transmit power from the first set to the second set.

In some examples of the method, the downlink subframe may include a transmission of a PCFICH, and the method may further include transmitting in the PCFICH an indication of whether a base station will be active in a next downlink subframe subsequent to the downlink subframe. In some examples, the downlink subframe may include a transmission of a PFFICH, and the method may further include winning contention for access to the shared radio frequency spectrum band, and transmitting the downlink subframe following the winning contention for access to the shared radio frequency spectrum band.

In some examples of the method, the downlink subframe may include a transmission of a PHICH, and the method may further include transmitting in the PHICH a group acknowledgement for a group of uplink subframes received from a UE. In some examples, the method may include transmitting the group acknowledgement with a set of cyclic redundancy check (CRC) bits. In some examples of the method, the downlink subframe may include a transmission of a first PHICH, and the method may further include transmitting in the first PHICH a first group acknowledgement for a first group of uplink subframes received from a first UE, and transmitting in a second PHICH, in a second downlink subframe, a second group acknowledgement for a second group of uplink subframes received from a second UE. The first group of uplink subframes may be received for a different time domain duplexing (TDD) frame structure than the second group of uplink subframes. In some examples, the downlink subframe may include a transmission of a PHICH, and the method may further include allocating at least one resource for the PHICH as a function of a UE grant starting resource block and an identifier of an uplink subframe.

In some examples of the method, the downlink subframe may include a CRS-based enhanced system information block (eSIB). In some examples, the downlink subframe may include a downlink clear channel assessment exempt transmission (D-CET) subframe. In some examples, the CRS-based eSIB may include one of a plurality of eSIBs transmitted on a periodic basis. In some examples, the downlink subframe may include at least one of: a data transmission for a UE, where the data transmission is based at least in part on a space frequency block coding (SFBC); a CRS-based channel quality indicator (CQI) measurement subframe; a transmission of a common search space grant in a self-scheduling mode; a transmission of a PCFICH; a transmission of a PFFICH; a transmission of a PDCCH; a transmission of a PHICH; or a transmission of a PBCH.

In an example, an apparatus for wireless communication is described. In one configuration, the apparatus may include means for identifying a configuration of a downlink subframe in a shared radio frequency spectrum band, and means for generating, based at least in part on the configuration of the downlink subframe, a cell-specific reference signal (CRS) for the downlink subframe.

In an example, another apparatus for wireless communication is described. In one configuration, the apparatus may include a processor, memory in electronic communication with the processor, and instructions stored in the memory. The instructions may be executable by the processor to identify a configuration of a downlink subframe in a shared radio frequency spectrum band, and generate, based at least in part on the configuration of the downlink subframe, a CRS for the downlink subframe.

In an example, a non-transitory computer-readable medium storing computer-executable code for wireless communication is described. In one configuration, the code may be executable by a processor to identify a configuration of a downlink subframe in a shared radio frequency spectrum band, and generate, based at least in part on the configuration of the downlink subframe, a CRS for the downlink subframe.

In an example, another method for wireless communication is described. In one configuration, the method may include dynamically determining a presence of a CRS in a downlink subframe in a shared radio frequency spectrum band, and performing at least one operation during the downlink subframe in response to the dynamic determination.

In some examples of the method, performing the at least one operation during the downlink subframe may include performing a measurement on the CRS to obtain a channel estimation, and decoding, based at least in part on the channel estimation, at least one of: a PCFICH, a PFFICH, a PDCCH, a PHICH, or a PBCH. In some examples of the method, dynamically determining the presence of the CRS may include at least one of: inferring the presence of the CRS in a CQI measurement subframe or a subframe including an eSIB, or decoding DCI received in a PDCCH or an ePDCCH. In some examples of the method, performing the at least one operation during the downlink subframe may include receiving a PCFICH, and receiving in the PCFICH an indication of whether a base station will be active in a next downlink subframe subsequent to the downlink subframe.

In some examples of the method, performing the at least one operation during the downlink subframe may include receiving a PHICH, and receiving in the PHICH a group acknowledgement for a group of uplink subframes. In some examples, the method may include receiving the group acknowledgement with a set of CRC bits.

In some examples of the method, performing the at least one operation during the downlink subframe may include performing a measurement on the CRS to obtain a channel estimation, and decoding, based at least in part on the channel estimation, an eSIB. In some examples, the downlink subframe may include a D-CET subframe. In some examples, the eSIB may include one of a plurality of eSIBs received on a periodic basis.

In some examples, the method may include inferring a presence of a PHICH in the downlink subframe based at least in part on a TDD frame structure of a frame in which the downlink subframe is included; and performing the at least one operation in the downlink subframe may include receiving a transmission of the PHICH during the downlink subframe.

In an example, another apparatus for wireless communication is described. In one configuration, the apparatus may include means for dynamically determining a presence of a CRS in a downlink subframe in a shared radio frequency spectrum band, and means for performing at least one operation during the downlink subframe in response to the dynamic determination.

In an example, another apparatus for wireless communication is descried. In one configuration, the apparatus may include a processor, memory in electronic communication with the processor, and instructions stored in the memory. The instructions may be executable by the processor to dynamically determine a presence of a CRS in a downlink subframe in a shared radio frequency spectrum band, and perform at least one operation during the downlink subframe in response to the dynamic determination.

In an example, another non-transitory computer-readable medium storing computer-executable code for wireless communication is described. In one configuration, the code may be executable by a processor to dynamically determine a presence of a CRS in a downlink subframe in a shared radio frequency spectrum band, and perform at least one operation during the downlink subframe in response to the dynamic determination.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If the first reference label is used in the specification, the description is applicable to any one of the similar components having the same first reference label irrespective of the second reference label.

DETAILED DESCRIPTION

Figure 1:
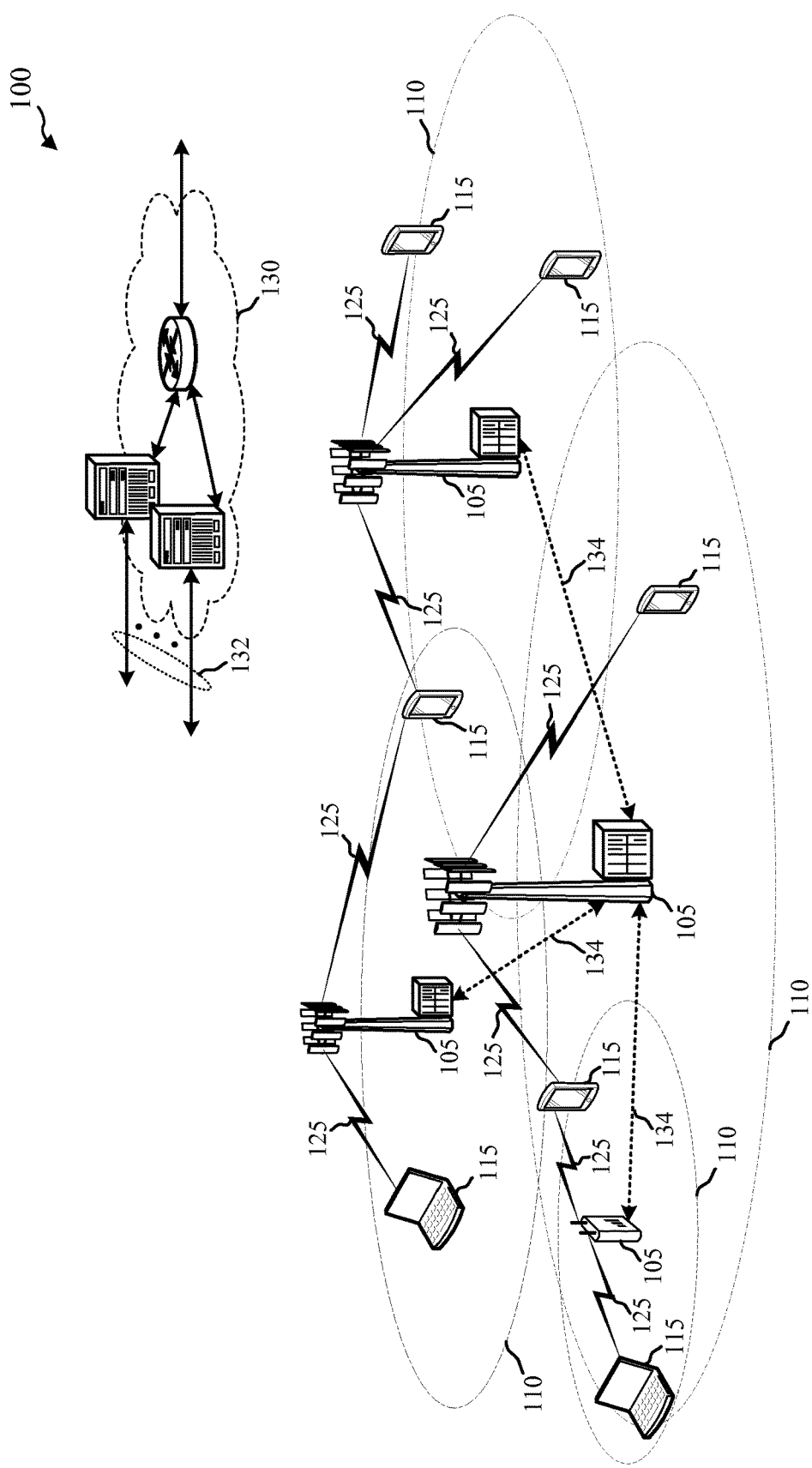
FIG. 1 illustrates an example of a wireless communication system, in accordance with various aspects of the disclosure.

Techniques are described in which a shared radio frequency spectrum band is used for at least a portion of communications over a wireless communication system. In some examples, the shared radio frequency spectrum band may be used for LTE/LTE-A communications. The shared radio frequency spectrum band may be used in combination with, or independent from, a dedicated radio frequency spectrum band. The dedicated radio frequency spectrum band may be a radio frequency spectrum band for which transmitting apparatuses may not contend for access because the radio frequency spectrum band is licensed to a subset of users, such as a licensed radio frequency spectrum band usable for LTE/LTE-A communications. The shared radio frequency spectrum band may be a radio frequency spectrum band for which a device may need to contend for access (e.g., a radio frequency spectrum band that is available for unlicensed use, such as Wi-Fi use, or a radio frequency spectrum band that is available for use by multiple operators in an equally shared or prioritized manner).

With increasing data traffic in cellular networks that use a dedicated radio frequency spectrum band, offloading of at least some data traffic to a shared radio frequency spectrum band may provide a cellular operator (e.g., an operator of a public land mobile network (PLMN) or a coordinated set of base stations defining a cellular network, such as an LTE/LTE-A network) with opportunities for enhanced data transmission capacity. Use of a shared radio frequency spectrum band may also provide service in areas where access to a dedicated radio frequency spectrum band is unavailable. As noted above, before communicating over a shared radio frequency spectrum band, transmitting apparatuses may perform an LBT procedure to gain access to the medium. Such an LBT procedure may include performing a CCA procedure (or extended CCA procedure) to determine whether a channel of the shared radio frequency spectrum band is available. When it is determined that the channel of the shared radio frequency spectrum band is available, a CUBS may be transmitted to reserve the channel. When it is determined that a channel is not available, a CCA procedure (or extended CCA procedure) may be performed for the channel again at a later time.

When CRS transmissions in a shared radio frequency spectrum band are limited to relatively sparse downlink CCA-exempt subframes, or to a relatively sparse number of CCA subframes that occur on a periodic basis, the relatively low frequency at which CRS transmissions are made may limit CRS use to CRS-based measurements or automatic gain control (AGC) and tracking loops. Because of the sparsity of CRS transmissions, control signal and data signal demodulation may be based on, for example, a UE reference signal (UE-RS) or a demodulation reference signal (DM-RS). However, UE-RSs and DM-RSs are precoded for a subset of UEs, and thus, CRS-based transmissions, which are precoded for a cell and not a specific UE, may not be made during a downlink subframe containing just a UE-RS or a DM-RS.

When CRSs are generated and transmitted for downlink subframes in a shared radio frequency spectrum band, based at least in part on the configurations of the downlink subframes, CRSs may be used for a wider range of purposes, including CRS-based transmissions and CRS-based operations. In some examples, a CRS may be generated for a downlink subframe when the configuration of the downlink subframe includes at least one of: a CRS; a data transmission for a UE, where the data transmission is based at least in part on a space frequency block coding (SFBC); a CRS-based channel quality indicator (CQI) measurement subframe; a CRS-based enhanced system information block (eSIB); a transmission of a common search space grant in a self-scheduling mode; a transmission of a physical control format indicator channel (PCFICH); a transmission of a physical frame format indicator channel (PFFICH), a transmission of a physical downlink control channel (PDCCH); a transmission of a physical hybrid automatic repeat request indicator channel (PHICH); or a transmission of a physical broadcast channel (PBCH). In downlink subframes having other configurations, a CRS may not be generated for the downlink subframe.

When a base station generates a CRS for a downlink subframe in a shared radio frequency spectrum band, based at least in part on a configuration of the downlink subframe, the base station may signal a presence of the CRS to UEs that are in communication with the base station. The signaling may enable the UEs to perform physical downlink shared channel (PDSCH) rate matching. In the same or other examples, UEs may be programmed to infer the presence of a CRS in some types of downlink subframes (e.g., CQI measurement subframes or subframes including an eSIB).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a wireless communication system 100, in accordance with various aspects of the disclosure. The wireless communication system 100 may include base stations 105, UEs 115, and a core network 130. The core network 130 may provide user authentication, access authorization, tracking, Internet Protocol (IP) connectivity, and other access, routing, or mobility functions. The base stations 105 may interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, a base station 105 may be referred to as a base transceiver station, a radio base station, an access point, a radio transceiver, a NodeB, an eNodeB (eNB), a Home NodeB, a Home eNodeB, or some other suitable terminology. The geographic coverage area 110 for a base station 105 may be divided into sectors making up a portion of the coverage area (not shown). The wireless communication system 100 may include base stations 105 of different types (e.g., macro or small cell base stations). There may be overlapping geographic coverage areas 110 for different technologies.

In some examples, the wireless communication system 100 may include an LTE/LTE-A network. In LTE/LTE-A networks, the term evolved Node B (eNB) may be used to describe the base stations 105, while the term UE may be used to describe the UEs 115. The wireless communication system 100 may be a Heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs with service subscriptions with the network provider. A small cell may be a lower-powered base station, as compared with a macro cell that may operate in the same or different (e.g., dedicated, shared, etc.) radio frequency spectrum bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the physical (PHY) layer, the transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment, including macro eNBs, small cell eNBs, relay base stations, and the like.

The communication links 125 shown in wireless communication system 100 may include downlink (DL) transmissions, from a base station 105 to a UE 115, or uplink (UL) transmissions, from a UE 115 to a base station 105. The downlink transmissions may also be called forward link transmissions, while the uplink transmissions may also be called reverse link transmissions. In some examples, DL transmissions may include transmissions of downlink control information (DCI), and UL transmissions may include transmissions of uplink control information (UCI). The DCI may be transmitted over a downlink control channel (e.g., a PDCCH or enhanced PDCCH (ePDCCH)). The DCI may include, for example, acknowledgements (ACKs) or non-acknowledgements (NAKs) of UL transmissions, or a SIB or eSIB. DL transmissions may also include the transmission of a PCFICH, a PFFICH, a PHICH, a PBCH, or a physical downlink shared channel (PDSCH). DL transmissions may also include transmissions of reference signals, such as a CRS, UE-RS, or DM-RS. Some types of DL transmissions may depend on the transmission of one or more reference signals, including the transmission of one or more reference signals. The UCI may be transmitted over an uplink control channel (e.g., a physical uplink control channel (PUCCH) or enhanced PUCCH (ePUCCH)). The UCI may include, for example, ACKs/NAKs of downlink transmissions, or channel state information (CSI). UL transmissions may also include transmissions of data, which may be transmitted over a physical uplink shared channel (PUSCH) or enhanced PUSCH (ePUSCH).

In some examples, each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using a frequency domain duplexing (FDD) operation (e.g., using paired spectrum resources) or a time domain duplexing (TDD) operation (e.g., using unpaired spectrum resources). Frame structures for FDD operation (e.g., frame structure type 1) and TDD operation (e.g., frame structure type 2) may be defined.

In some examples of the wireless communication system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple-input, multiple-output (MIMO) techniques that may take advantage of multi-path environments to transmit multiple spatial layers carrying the same or different coded data.

The wireless communication system 100 may support operation on multiple cells or carriers, a feature which may be referred to as carrier aggregation (CA) or dual-connectivity operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some examples, the wireless communication system 100 may support operation over a dedicated radio frequency spectrum band (e.g., a radio frequency spectrum band for which transmitting apparatuses may not contend for access because the radio frequency spectrum band is licensed to a subset of users for various uses, such as a licensed radio frequency spectrum band usable for LTE/LTE-A communications) or a shared radio frequency spectrum band (e.g., a radio frequency spectrum band for which transmitting apparatuses may need to contend for access (e.g., a radio frequency spectrum band that is available for unlicensed use, such as Wi-Fi use, or a radio frequency spectrum band that is available for use by multiple operators in an equally shared or prioritized manner)). Upon winning a contention for access to the shared radio frequency spectrum band, a transmitting apparatus (e.g., a base station 105 or UE 115) may transmit one or more CUBS over the shared radio frequency spectrum band. The CUBS may reserve the shared radio frequency spectrum by providing a detectable energy on the shared radio frequency spectrum band. The CUBS may also serve to identify the transmitting apparatus or serve to synchronize the transmitting apparatus and a receiving apparatus.

Figure 2:
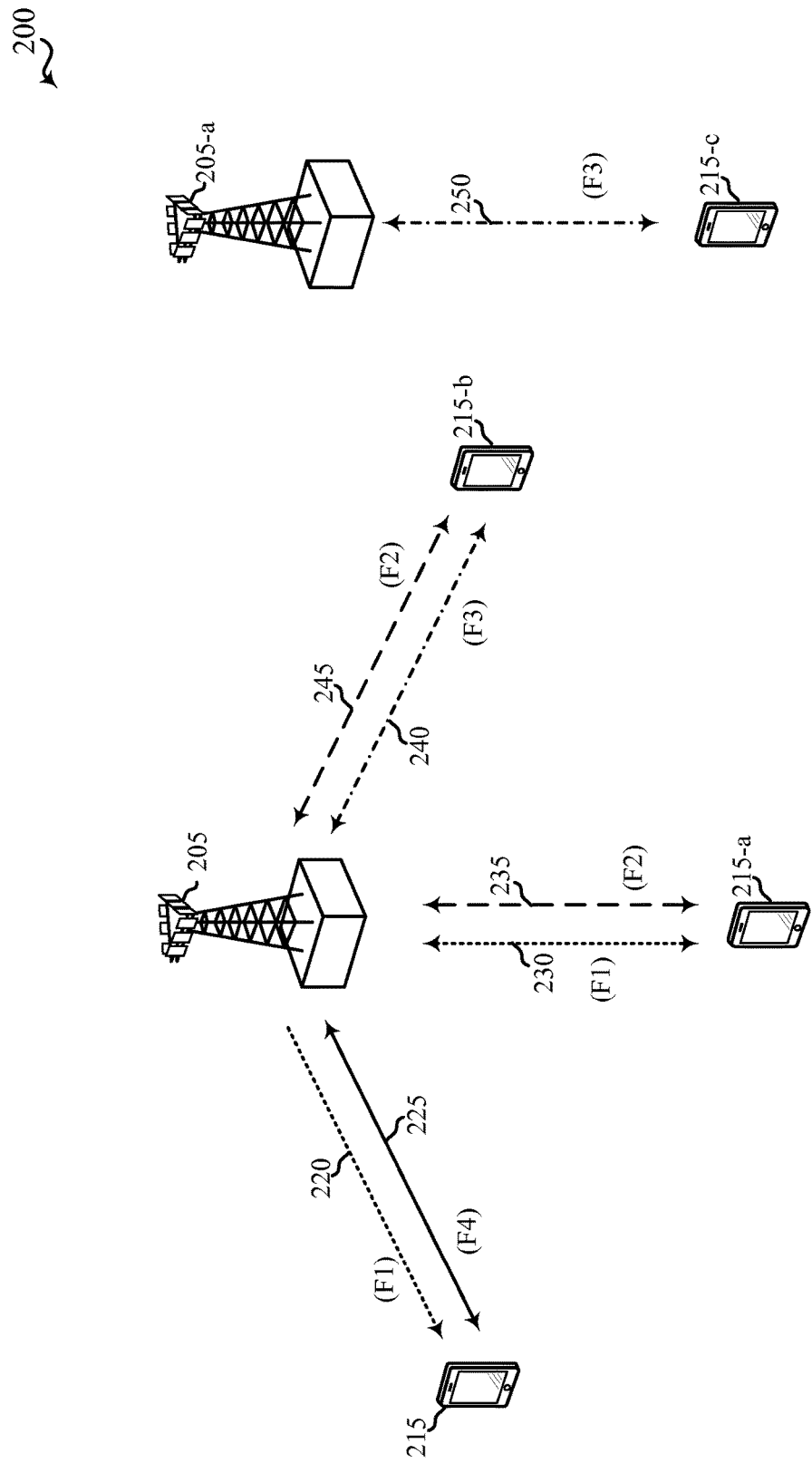
FIG. 2 shows a wireless communication system in which LTE/LTE-A may be deployed under different scenarios using a shared radio frequency spectrum band, in accordance with various aspects of the present disclosure.

FIG. 2 shows a wireless communication system 200 in which LTE/LTE-A may be deployed under different scenarios using a shared radio frequency spectrum band, in accordance with various aspects of the present disclosure. More specifically, FIG. 2 illustrates examples of a supplemental downlink mode (also referred to as a shared downlink mode), a carrier aggregation mode, and a standalone mode in which LTE/LTE-A is deployed using a shared radio frequency spectrum band. The wireless communication system 200 may be an example of portions of the wireless communication system 100 described with reference to FIG. 1. Moreover, a first base station 205 and a second base station 205-a may be examples of aspects of one or more of the base stations 105 described with reference to FIG. 1, while a first UE 215, a second UE 215-a, a third UE 215-b, and a fourth UE 215-c may be examples of aspects of one or more of the UEs 115 described with reference to FIG. 1.

In the example of a supplemental downlink mode in the wireless communication system 200, the first base station 205 may transmit OFDMA waveforms to the first UE 215 using a downlink channel 220. The downlink channel 220 may be associated with a frequency F1 in a shared radio frequency spectrum band. The first base station 205 may transmit OFDMA waveforms to the first UE 215 using a first bidirectional link 225 and may receive SC-FDMA waveforms from the first UE 215 using the first bidirectional link 225. The first bidirectional link 225 may be associated with a frequency F4 in a dedicated radio frequency spectrum band. The downlink channel 220 in the shared radio frequency spectrum band and the first bidirectional link 225 in the dedicated radio frequency spectrum band may operate contemporaneously. The downlink channel 220 may provide a downlink capacity offload for the first base station 205. In some examples, the downlink channel 220 may be used for unicast services (e.g., addressed to one UE) or for multicast services (e.g., addressed to several UEs). This scenario may occur with any service provider (e.g., a mobile network operator (MNO)) that uses a dedicated radio frequency spectrum and needs to relieve some of the traffic or signaling congestion.

In one example of a carrier aggregation mode in the wireless communication system 200, the first base station 205 may transmit OFDMA waveforms to the second UE 215-a using a second bidirectional link 230 and may receive OFDMA waveforms, SC-FDMA waveforms, or resource block interleaved FDMA waveforms from the second UE 215-a using the second bidirectional link 230. The second bidirectional link 230 may be associated with the frequency F1 in the shared radio frequency spectrum band. The first base station 205 may also transmit OFDMA waveforms to the second UE 215-a using a third bidirectional link 235 and may receive SC-FDMA waveforms from the second UE 215-a using the third bidirectional link 235. The third bidirectional link 235 may be associated with a frequency F2 in a dedicated radio frequency spectrum band. The second bidirectional link 230 may provide a downlink and uplink capacity offload for the first base station 205. Like the supplemental downlink described above, this scenario may occur with any service provider (e.g., MNO) that uses a dedicated radio frequency spectrum and needs to relieve some of the traffic or signaling congestion.

In another example of a carrier aggregation mode in the wireless communication system 200, the first base station 205 may transmit OFDMA waveforms to the third UE 215-b using a fourth bidirectional link 240 and may receive OFDMA waveforms, SC-FDMA waveforms, or resource block interleaved waveforms from the third UE 215-b using the fourth bidirectional link 240. The fourth bidirectional link 240 may be associated with a frequency F3 in the shared radio frequency spectrum band. The first base station 205 may also transmit OFDMA waveforms to the third UE 215-b using a fifth bidirectional link 245 and may receive SC-FDMA waveforms from the third UE 215-b using the fifth bidirectional link 245. The fifth bidirectional link 245 may be associated with the frequency F2 in the dedicated radio frequency spectrum band. The fourth bidirectional link 240 may provide a downlink and uplink capacity offload for the first base station 205. This example and those provided above are presented for illustrative purposes and there may be other similar modes of operation or deployment scenarios that combine LTE/LTE-A in a dedicated radio frequency spectrum band and use a shared radio frequency spectrum band for capacity offload.

As described above, one type of service provider that may benefit from the capacity offload offered by using LTE/LTE-A in a shared radio frequency spectrum band is a traditional MNO having access rights to an LTE/LTE-A dedicated radio frequency spectrum band. For these service providers, an operational example may include a bootstrapped mode (e.g., supplemental downlink, carrier aggregation) that uses the LTE/LTE-A primary component carrier (PCC) on the dedicated radio frequency spectrum band and at least one secondary component carrier (SCC) on the shared radio frequency spectrum band.

In the carrier aggregation mode, data and control may, for example, be communicated in the dedicated radio frequency spectrum band (e.g., via the first bidirectional link 225, the third bidirectional link 235, and the fifth bidirectional link 245) while data may, for example, be communicated in the shared radio frequency spectrum band (e.g., via the second bidirectional link 230 and the fourth bidirectional link 240). The carrier aggregation mechanisms supported when using a shared radio frequency spectrum band may fall under a hybrid frequency division duplexing-time division duplexing (FDD-TDD) carrier aggregation or a FDD-TDD carrier aggregation with different symmetry across component carriers.

In one example of a standalone mode in the wireless communication system 200, the second base station 205-$a$ may transmit OFDMA waveforms to the fourth UE 215-$c$ using a bidirectional link 250 and may receive OFDMA waveforms, SC-FDMA waveforms, or resource block interleaved FDMA waveforms from the fourth UE 215-$c$ using the bidirectional link 250. The bidirectional link 250 may be associated with the frequency F3 in the shared radio frequency spectrum band. The standalone mode may be used in non-traditional wireless access scenarios, such as in-stadium access (e.g., unicast, multicast). An example of a type of service provider for this mode of operation may be a stadium owner, cable company, event host, hotel, enterprise, or large corporation that does not have access to a dedicated radio frequency spectrum band.

In some examples, a transmitting apparatus such as one of the base stations 105, 205, or 205-$a$ described with reference to FIG. 1 or 2, or one of the UEs 115, 215, 215-$a$, 215-$b$, or 215-$c$ described with reference to FIG. 1 or 2, may use a gating interval to gain access to a channel of a shared radio frequency spectrum band (e.g., to a physical channel of the shared radio frequency spectrum band). In some examples, the gating interval may be periodic. For example, a periodic gating interval may be synchronized with at least one boundary of an LTE/LTE-A radio interval. The gating interval may define the application of a contention-based protocol, such as an LBT protocol based on the LBT protocol specified in European Telecommunications Standards Institute (ETSI) (EN 301 893). When using a gating interval that defines the application of an LBT protocol, the gating interval may indicate when a transmitting apparatus needs to perform a contention procedure (e.g., an LBT procedure) such as a clear channel assessment (CCA) procedure. The outcome of the CCA procedure may indicate to the transmitting apparatus whether a channel of a shared radio frequency spectrum band is available or in use for the gating interval (also referred to as an LBT radio frame). When a CCA procedure indicates that the channel is available for a corresponding LBT radio frame (e.g., "clear" for use), the transmitting apparatus may reserve or use the channel of the shared radio frequency spectrum band during part or all of the LBT radio frame. When the CCA procedure indicates that the channel is not available (e.g., that the channel is in use or reserved by another transmitting apparatus), the transmitting apparatus may be prevented from using the channel during the LBT radio frame.

Figure 3:
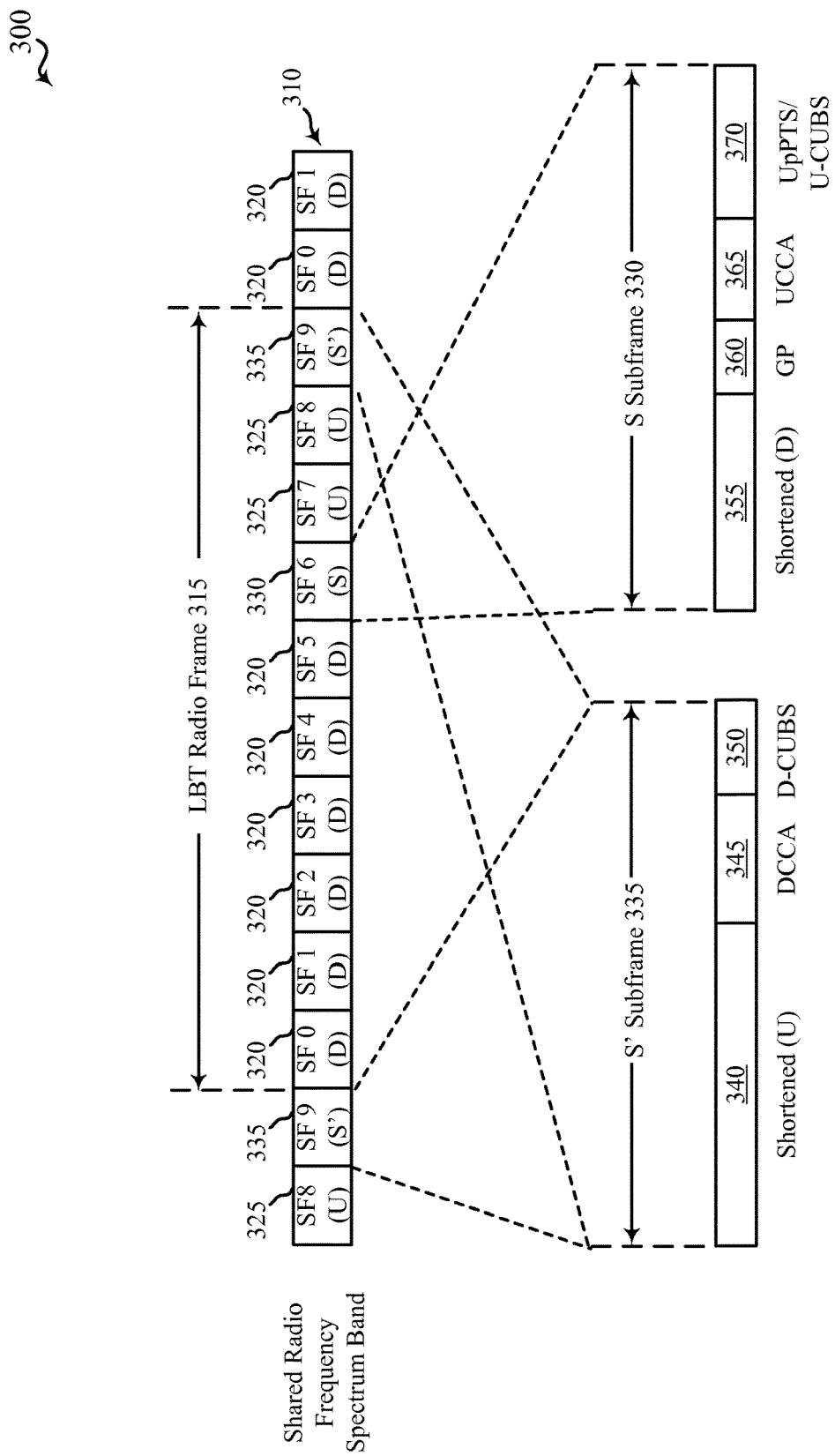
FIG. 3 shows an example of a wireless communication over a shared radio frequency spectrum band, in accordance with various aspects of the present disclosure.

FIG. 3 shows an example 300 of a wireless communication 310 over a shared radio frequency spectrum band, in accordance with various aspects of the present disclosure. In some examples, the wireless communication 310 may include a transmission of one or more uplink component carriers, in which uplink component carrier(s) may be transmitted, for example, as part of a transmission made according to the supplemental downlink mode, the carrier aggregation mode, or the standalone mode described with reference to FIG. 2.

In some examples, an LBT radio frame 315 of the wireless communication 310 may have a duration of ten milliseconds and include a number of downlink (D) subframes 320, a number of uplink (U) subframes 325, and two types of special subframes, an S subframe 330 and an S' subframe 335. The S subframe 330 may provide a transition between downlink subframes 320 and uplink subframes 325, while the S' subframe 335 may provide a transition between uplink subframes 325 and downlink subframes 320 and, in some examples, a transition between LBT radio frames.

During the S' subframe 335, a downlink clear channel assessment (DCCA) procedure 345 may be performed by one or more base stations, such as one or more of the base stations 105, 205, or 205-$a$ described with reference to FIG. 1 or 2, to reserve, for a period of time, a channel of the shared radio frequency spectrum band over which the wireless communication 310 occurs. Following a successful DCCA procedure 345 by a base station, the base station may transmit a channel usage beacon signal (CUBS) (e.g., a downlink CUBS (D-CUBS 350)) to provide an indication to other base stations or apparatuses (e.g., UEs, Wi-Fi access points, etc.) that the base station has reserved the channel. In some examples, a D-CUBS 350 may be transmitted using a plurality of interleaved resource blocks. Transmitting a D-CUBS 350 in this manner may enable the D-CUBS 350 to occupy at least a percentage of the available frequency bandwidth of the shared radio frequency spectrum band and satisfy one or more regulatory requirements (e.g., a requirement that transmissions over the shared radio frequency spectrum band occupy at least 80% of the available frequency bandwidth). The D-CUBS 350 may in some examples take a form similar to that of an LTE/LTE-A CRS or a channel state information reference signal (CSI-RS). When the DCCA procedure 345 fails, the D-CUBS 350 may not be transmitted.

The S' subframe 335 may include a plurality of OFDM symbol periods (e.g., 14 OFDM symbol periods). A first portion of the S' subframe 335 may be used by a number of UEs as a shortened uplink (U) period. A second portion of the S' subframe 335 may be used for the DCCA procedure 345. A third portion of the S' subframe 335 may be used by one or more base stations that successfully contend for access to the channel of the shared radio frequency spectrum band to transmit the D-CUBS 350.

During the S subframe 330, an uplink CCA (UCCA) procedure 365 may be performed by one or more UEs, such as one or more of the UEs 115, 215, 215-$a$, 215-$b$, or 215-$c$ described above with reference to FIG. 1 or 2, to reserve, for a period of time, the channel over which the wireless communication 310 occurs. Following a successful UCCA procedure 365 by a UE, the UE may transmit an uplink CUBS (U-CUBS 370) to provide an indication to other UEs or apparatuses (e.g., base stations, Wi-Fi access points, etc.) that the UE has reserved the channel. In some examples, a U-CUBS 370 may be transmitted using a plurality of interleaved resource blocks. Transmitting a U-CUBS 370 in this manner may enable the U-CUBS 370 to occupy at least a percentage of the available frequency bandwidth of the shared radio frequency spectrum band and satisfy one or more regulatory requirements (e.g., the requirement that transmissions over the shared radio frequency spectrum band occupy at least 80% of the available frequency bandwidth). The U-CUBS 370 may in some examples take a form similar to that of an LTE/LTE-A CRS or CSI-RS. When the UCCA procedure 365 fails, the U-CUBS 370 may not be transmitted.

The S subframe 330 may include a plurality of OFDM symbol periods (e.g., 14 OFDM symbol periods). A first portion of the S subframe 330 may be used by a number of base stations as a shortened downlink (D) period 355. A second portion of the S subframe 330 may be used as a guard period (GP) 360. A third portion of the S subframe 330 may be used for the UCCA procedure 365. A fourth portion of the S subframe 330 may be used by one or more UEs that successfully contend for access to the channel of the shared radio frequency spectrum band as an uplink pilot time slot (UpPTS) or to transmit the U-CUBS 370.

In some examples, the DCCA procedure 345 or the UCCA procedure 365 may include the performance of a single CCA procedure. In other examples, the DCCA procedure 345 or the UCCA procedure 365 may include the performance of an extended CCA procedure. The extended CCA procedure may include a random number of CCA procedures and, in some examples, may include a plurality of CCA procedures. The terms DCCA procedure and UCCA procedure are therefore intended to be broad enough to cover the performance of either a single CCA procedure or an extended CCA procedure. The selection of a single CCA procedure or an extended CCA procedure, for performance by a base station or a UE during an LBT radio frame, may be based on LBT rules. In some cases, the term CCA procedure may be used in this disclosure, in a general sense, to refer to either a single CCA procedure or an extended CCA procedure.

By way of example, the LBT radio frame 315 has a DDDDDDSUUS' TDD frame structure. In other examples, an LBT radio frame may have a different TDD frame structure. For example, an LBT frame may have one of the TDD frame structures used in enhanced interference mitigation and traffic adaptation (eIMTA).

Figure 4:
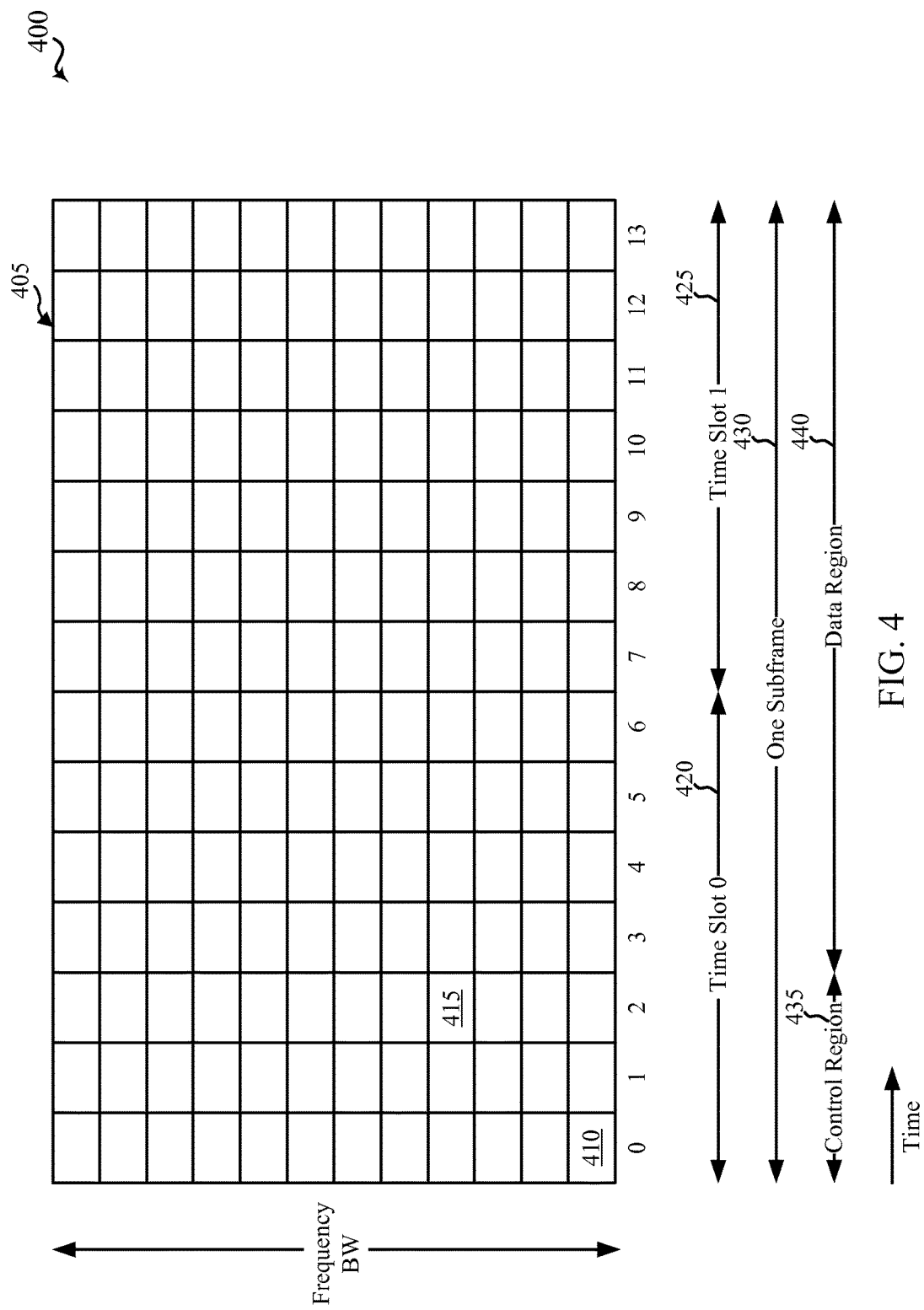
FIG. 4 shows a diagram of a resource block used for one or more wireless communications in a shared radio frequency spectrum band, in accordance with various aspects of the present disclosure.

FIG. 4 shows a diagram 400 of a resource block 405 used for one or more wireless communications in a shared radio frequency spectrum band, in accordance with various aspects of the present disclosure. In some examples, the resource block 405 may be an example of one or more resource blocks transmitted as part of a downlink subframe 320 described with reference to FIG. 3.

By way of example, the resource block 405 may include a plurality of resource elements (including, for example, resource element 410 or 415) extending in time or frequency dimensions. In some examples, the resource block 405 may include resource elements spanning fourteen OFDM symbol periods (numbered 0 through 13), two slots 420 and 425, or one subframe 430 in a time dimension, and twelve frequency subcarriers (subcarriers) spanning a frequency bandwidth (BW). In some examples, the duration of the subframe 430 may be one millisecond.

In some examples, the resource block 405 may be include a first set of at least one symbol period defining a control region 435, and a second set of at least one symbol period defining a data region 440. By way of example, the control region 435 of the resource block 405 is shown to include a first symbol period (0), a second symbol period (1), and a third symbol period (2) of the resource block 405, and the data region 440 is shown to include the fourth symbol period (3) through the fourteenth symbol period (13) of the resource block 405.

In some examples, the control region 435 may include a transmission of a CRS and a transmission of at least a PDCCH, a PCFICH, a PFFICH, a PHICH, a PBCH, or an eSIB. The PCFICH may include an indication of the number of OFDM symbol periods used for a control region transmitted in a downlink subframe. The PCFICH may also include an indication of whether a base station will be active in a next downlink subframe subsequent to the downlink subframe. In some examples, the indication may include one extra bit in the PCFICH. In the absence of a CRS, the PFFICH may be multiplexed with a DCUBS. However, when a CRS may be dynamically generated for a downlink subframe, the PFFICH may be transmitted in a downlink subframe (or resource block 405) after a base station wins contention for access to a shared radio frequency spectrum band. The PFFICH may share the same resource element groups (REGs) used by a PDCCH, a PCFICH, a PHICH, etc. The PHICH may include a group acknowledgement for a group of uplink subframes received from a UE (e.g., an acknowledgement having an acknowledgment bit for each of a number of contiguous uplink subframes received from a UE). In some examples, the group acknowledgement may be transmitted with a set of cyclic redundancy check (CRC) bits. The structure of a PHICH may be that of a PHICH transmitted for LTE/LTE-A communications in a dedicated radio frequency spectrum band, or a PDCCH-like structure for carrying a group acknowledgement with a set of CRC bits. A base station may ensure that PHICH resources for data transmitted across subframes do not collide (e.g., a base station may allocate at least one resource for a PHICH as a function of a UE grant starting resource block and an identifier of an uplink subframe). The eSIB may be a CRS-based eSIB, regardless of whether a downlink subframe including the resource block 405 is transmitted in a D-CET subframe or a CCA subframe. Potential advantages to transmitting a CRS-based eSIB include: no precoding allows uniform coverage for all UEs in a cell; wideband channel estimation can improve robustness for bursty interference; and an ability to use a PDCCH for allocating a grant instead of defining a common search space for an ePDCCH.

In some examples, a transmission of a downlink subframe (or the resource block 405) in a shared radio frequency spectrum band may have a requirement that the transmission spans a majority of a resource block's frequency BW (e.g., a requirement that the transmission satisfies a minimum bandwidth occupancy of 80% of the resource block's frequency BW). In some examples of a CRS-based transmission, a CRS may be transmitted in the first symbol period (0) of the resource block 405 and, alone or in combination with the transmission of one or more control channels, may satisfy a minimum bandwidth occupancy. However, in some examples, the CRS may not be transmitted in the second symbol period (1) or the third symbol period (2). As a result, the one or more control channels transmitted in the second symbol period (1) or the third symbol period (2) may not satisfy the minimum bandwidth occupancy. In these latter examples, an aggregation level in the second symbol period (1) or third symbol period (2) may be increased to satisfy the minimum bandwidth occupancy, or a filler symbol may be transmitted over at least one tone in the second symbol period (1) or third symbol period (2). The filler symbol may, in some examples, include a junk symbol (e.g., a symbol that is not decoded or discarded by a UE).

In examples in which a CRS is transmitted in the first symbol period (0), a base station may boost a transmit power in the second symbol period (1) or third symbol period (2) to maintain a constant transmit power from the first symbol period (0) to the second symbol period (1) to the third symbol period (2). In some examples, a base station may also or alternatively boost a transmit power in at least one symbol period in the control region 435 to maintain a constant transmit power from the control region 435 to the data region 440. In some examples, a base station may boost a transmit power by increasing the transmit power of the tones on which one or more channels are transmitted. In some examples, a base station may boost a transmit power by transmitting additional channels or junk symbols on additional tones. The maintenance of a constant transmit power can be useful in preventing another transmitting apparatus from grabbing a channel and beginning a transmission when a base station is transmitting at a lower transmit power, where lower transmit power may be interpreted by the other transmitting apparatus as a channel release.

Figure 5:
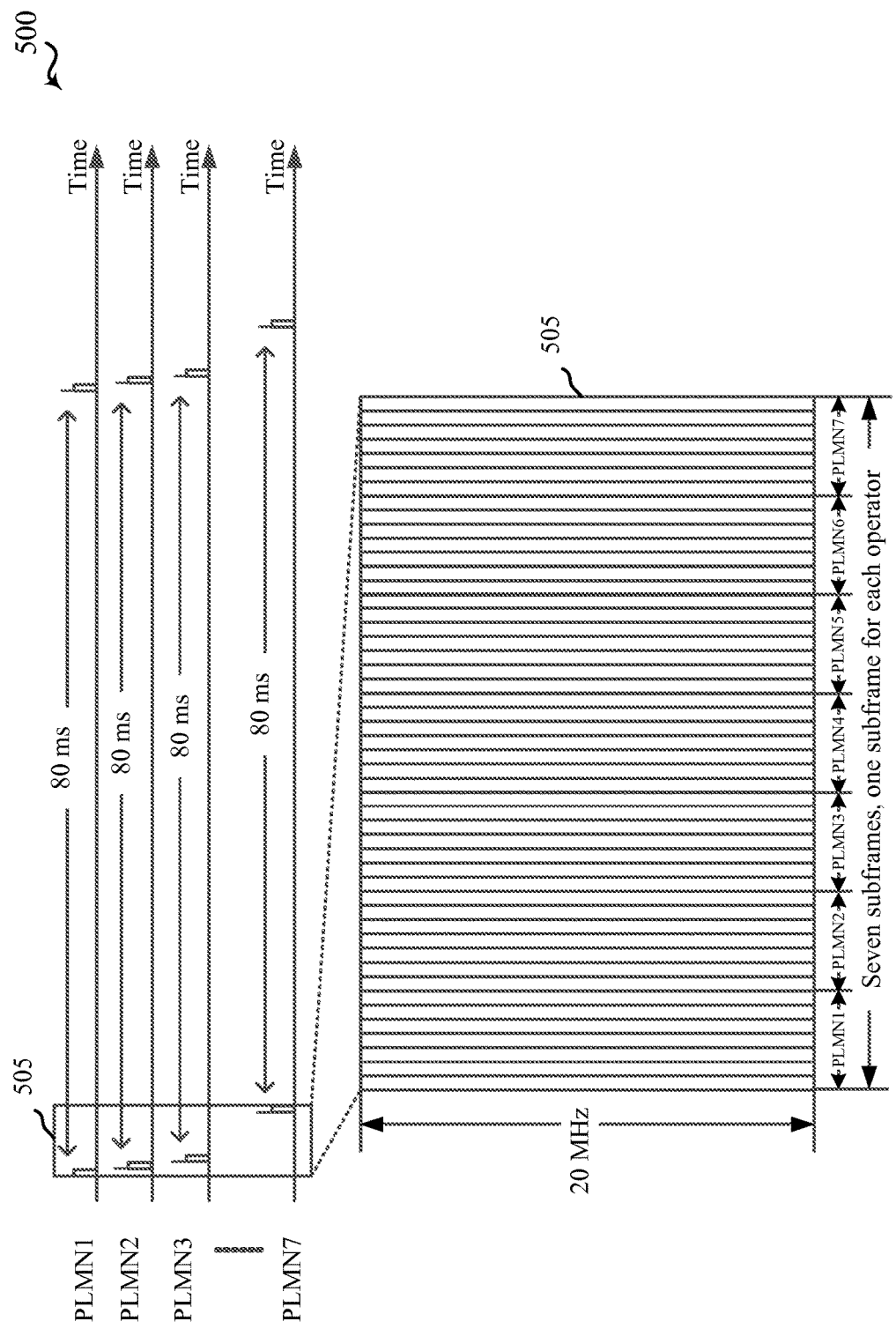
FIG. 5 shows an example resource allocation for CCA-Exempt Transmissions (CETs) in a shared radio frequency spectrum band, in accordance with various aspects of the present disclosure.

FIG. 5 shows an example 500 resource allocation for CCA-Exempt Transmissions (CETs) in a shared radio frequency spectrum band, in accordance with various aspects of the present disclosure. A CET may be made without winning a contention for access to the shared radio frequency spectrum band and, in some examples, without performing a CCA (e.g., a DCCA or UCCA). Instead, an operator may be exempted from performing a CCA for the purpose of transmitting a CET.

As shown, an allocation of resources 505 for CETs may be made, for example, once every eighty milliseconds (80 ms) or once every CET period, where the CET period may have a configurable periodicity. Each of a number of operators (e.g., different PLMNs) in the shared radio frequency spectrum band may be provided a separate subframe (shown) or subframes (not shown) for transmitting CETs. A subframe in which a CET may be transmitted may be referred to as a preconfigured CET occasion. By way of example, FIG. 5 shows adjacent CET subframes for seven different operators (e.g., operators PLMN1, PLMN2, . . . , PLMN7). Such a CET transmission framework may be applicable (e.g., separately applicable) to downlink and/or uplink transmissions between a base station and a UE (e.g., in the form of preconfigured uplink CET (U-CET) occasions or preconfigured downlink CET (D-CET) occasions). In some examples, a D-CET occasion may be used by a base station for transmitting a CRS or eSIB.

Although FIG. 5 illustrates an example resource allocation for CETs of synchronous operators, resources may also be allocated for CETs of asynchronous operators.

Figure 6:
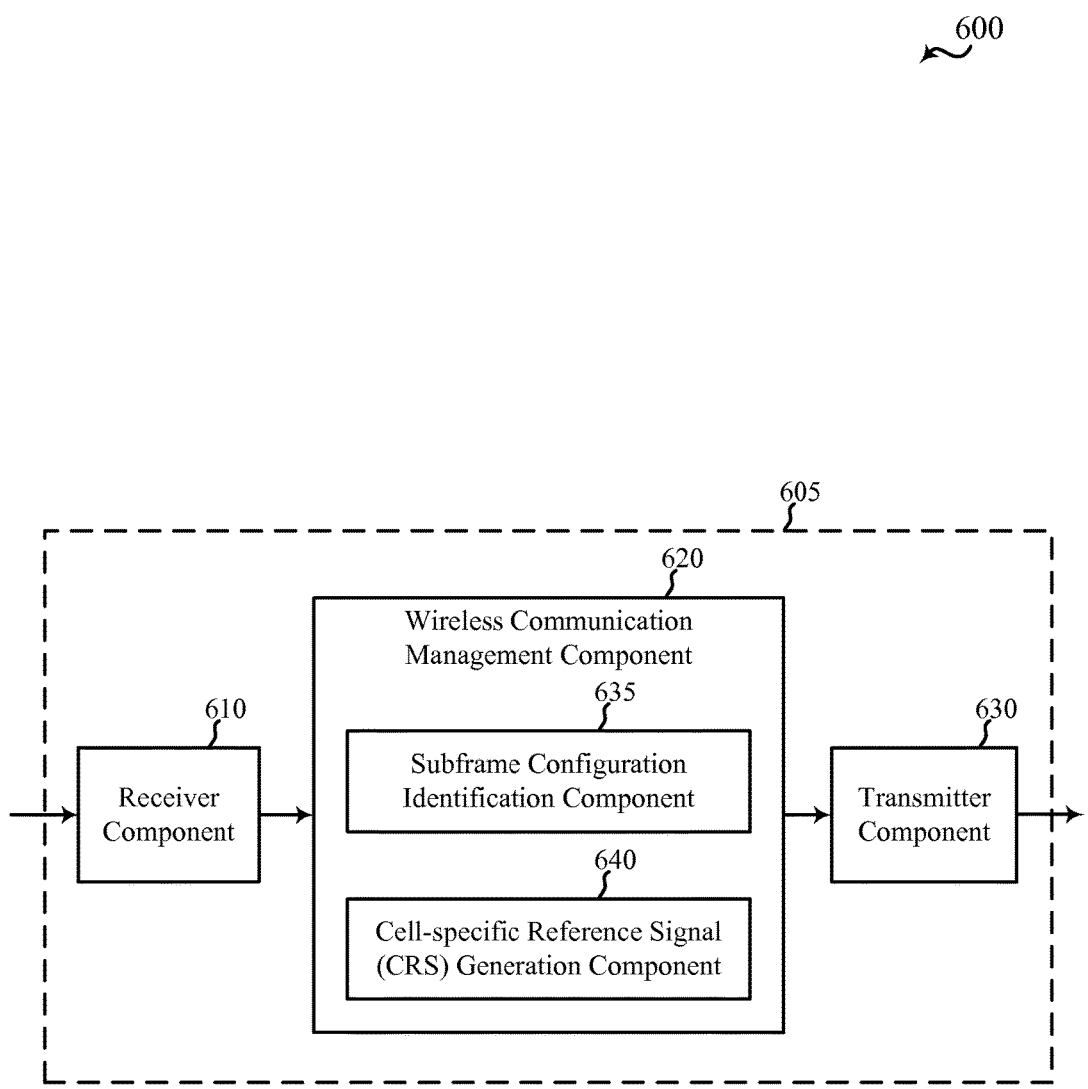
FIG. 6 shows a block diagram of an apparatus for use in wireless communication, in accordance with various aspects of the present disclosure.

FIG. 6 shows a block diagram 600 of an apparatus 605 for use in wireless communication, in accordance with various aspects of the present disclosure. The apparatus 605 may be an example of aspects of one or more of the base stations 105, 205, or 205-*a* described with reference to FIG. 1 or 2. The apparatus 605 may also be or include a processor. The apparatus 605 may include a receiver component 610, a wireless communication management component 620, or a transmitter component 630. Each of these components may be in communication with each other.

The components of the apparatus 605 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each component may also be implemented, in whole or in part, with instructions embodied in a memory, formatted to be executed by one or more general or application-specific processors.

In some examples, the receiver component 610 may include at least one radio frequency (RF) receiver, such as at least one RF receiver operable to receive transmissions over a dedicated radio frequency spectrum band (e.g., a radio frequency spectrum band for which transmitting apparatuses may not contend for access because the radio frequency spectrum band is licensed to a subset of users for various uses, such as a licensed radio frequency spectrum band usable for LTE/LTE-A communications) or a shared radio frequency spectrum band (e.g., a radio frequency spectrum band for which transmitting apparatuses may need to contend for access (e.g., a radio frequency spectrum band that is available for unlicensed use, such as Wi-Fi use, or a radio frequency spectrum band that is available for use by multiple operators in an equally shared or prioritized manner)). In some examples, the dedicated radio frequency spectrum band or the shared radio frequency spectrum band may be used for LTE/LTE-A communications, as described, for example, with reference to FIG. 1, 2, 3, 4, or 5. The receiver component 610 may be used to receive various types of data or control signals (i.e., transmissions) over one or more communication links of a wireless communication system, such as one or more communication links of the wireless communication system 100 or 200 described with reference to FIG. 1 or 2. The communication links may be established over the first radio frequency spectrum band or the second radio frequency spectrum band.

In some examples, the transmitter component 630 may include at least one RF transmitter, such as at least one RF transmitter operable to transmit over the dedicated radio frequency spectrum band or the shared radio frequency spectrum band. The transmitter component 630 may be used to transmit various types of data or control signals (i.e., transmissions) over one or more communication links of a wireless communication system, such as one or more communication links of the wireless communication system 100 or 200 described with reference to FIG. 1 or 2. The communication links may be established over the dedicated radio frequency spectrum band or the shared radio frequency spectrum band.

In some examples, the wireless communication management component 620 may be used to manage one or more aspects of wireless communication for the apparatus 605. In some examples, the wireless communication management component 620 may include a subframe configuration identification component 635 or a CRS generation component 640.

In some examples, the subframe configuration identification component 635 may be used to identify a configuration of a downlink subframe in the shared radio frequency spectrum band. In some examples, the downlink subframe may be configured to include at least one of: a data transmission for a UE, where the data transmission is based at least in part on a SFBC; a CRS-based CQI measurement subframe; a CRS-based eSIB; a transmission of a common search space grant in a self-scheduling mode; a transmission of a PCFICH; a transmission of a PFFICH, a transmission of a PDCCH; a transmission of a PHICH; or a transmission of a PBCH. The downlink subframe may also be configured to include other or alternative transmissions. When the downlink subframe is configured to include a CRS-based eSIB, the downlink subframe may be a D-CET subframe or the CRS-based eSIB may be one of a plurality of eSIBs transmitted on a periodic basis.

In some examples, the CRS generation component 640 may be used to generate, based at least in part on an identification made by the subframe configuration identification component 635, a CRS for a downlink subframe. For example, the CRS generation component 640 may generate a CRS for a downlink subframe when the configuration of the downlink subframe includes at least one of: a data transmission for a UE, where the data transmission is based at least in part on a SFBC; a CRS-based CQI measurement subframe; a CRS-based eSIB; a transmission of a common search space grant in a self-scheduling mode; a transmission of a PCFICH; a transmission of a PFFICH, a transmission of a PDCCH; a transmission of a PHICH; or a transmission of a PBCH.

Figure 7:
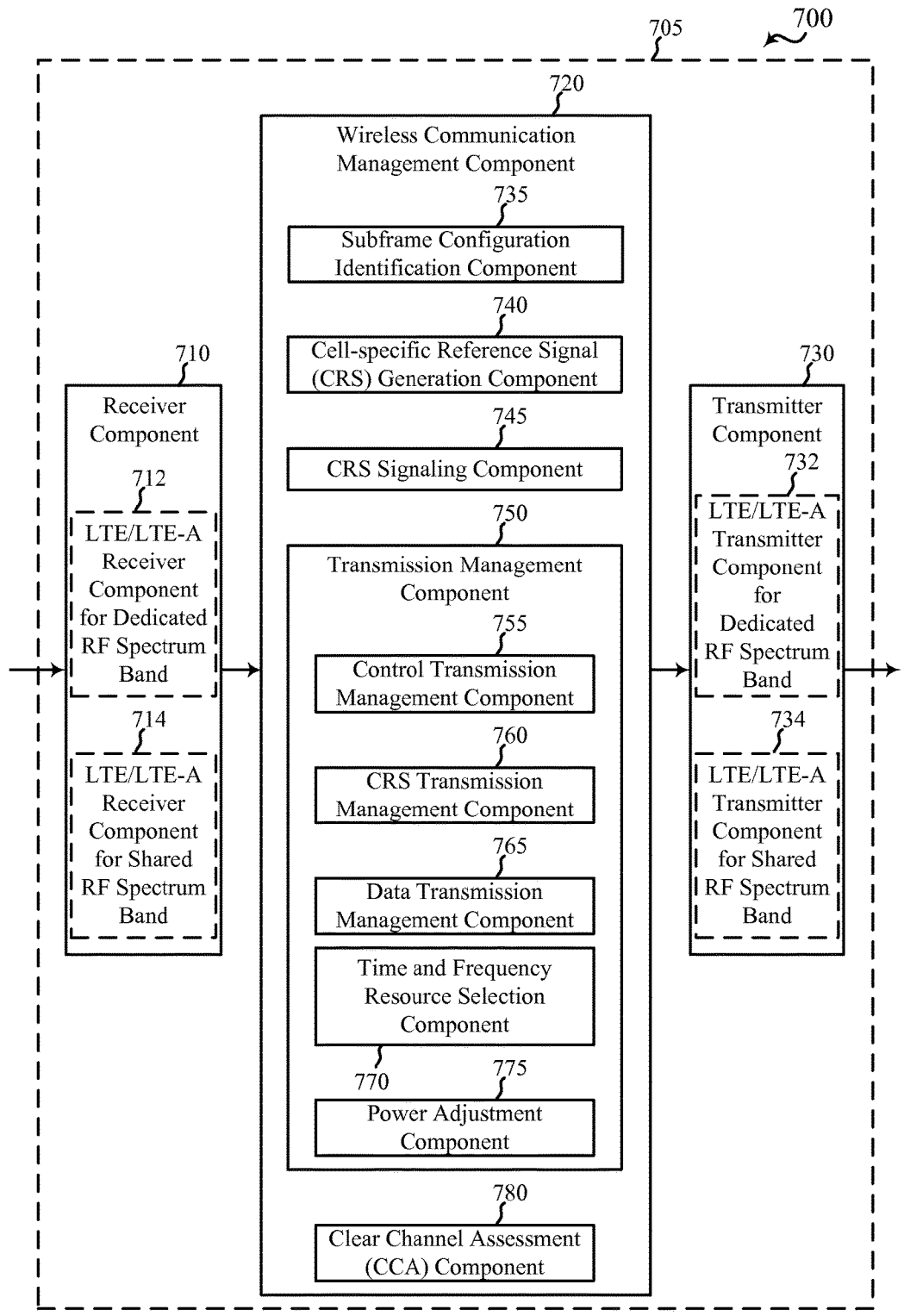
FIG. 7 shows a block diagram of an apparatus for use in wireless communication, in accordance with various aspects of the present disclosure.

FIG. 7 shows a block diagram 700 of an apparatus 705 for use in wireless communication, in accordance with various aspects of the present disclosure. The apparatus 705 may be an example of aspects of one or more of the base stations 105, 205, or 205-a described with reference to FIG. 1 or 2, or aspects of the apparatus 605 described with reference to FIG. 6. The apparatus 705 may also be or include a processor. The apparatus 705 may include a receiver component 710, a wireless communication management component 720, or a transmitter component 730. Each of these components may be in communication with each other.

The components of the apparatus 705 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each component may also be implemented, in whole or in part, with instructions embodied in a memory, formatted to be executed by one or more general or application-specific processors.

In some examples, the receiver component 710 may include at least one RF receiver, such as at least one RF receiver operable to receive transmissions over a dedicated radio frequency spectrum band (e.g., a radio frequency spectrum band for which transmitting apparatuses may not contend for access because the radio frequency spectrum band is licensed to a subset of users for various uses, such as a licensed radio frequency spectrum band usable for LTE/LTE-A communications) or a shared radio frequency spectrum band (e.g., a radio frequency spectrum band for which transmitting apparatuses may need to contend for access (e.g., a radio frequency spectrum band that is available for unlicensed use, such as Wi-Fi use, or a radio frequency spectrum band that is available for use by multiple operators in an equally shared or prioritized manner)).

In some examples, the dedicated radio frequency spectrum band or the shared radio frequency spectrum band may be used for LTE/LTE-A communications, as described, for example, with reference to FIG. 1 or 2. The receiver component 710 may in some cases include separate receivers for the dedicated radio frequency spectrum band and the shared radio frequency spectrum band. The separate receivers may, in some examples, take the form of an LTE/LTE-A receiver component for communicating over the dedicated radio frequency spectrum band (e.g., LTE/LTE-A receiver component for dedicated RF spectrum band 712), and an LTE/LTE-A receiver component for communicating over the shared radio frequency spectrum band (e.g., LTE/LTE-A receiver component for shared RF spectrum band 714). The receiver component 710, including the LTE/LTE-A receiver component for dedicated RF spectrum band 712 or the LTE/LTE-A receiver component for shared RF spectrum band 714, may be used to receive various types of data or control signals (i.e., transmissions) over one or more communication links of a wireless communication system, such as one or more communication links of the wireless communication system 100 or 200 described with reference to FIG. 1 or 2. The communication links may be established over the dedicated radio frequency spectrum band or the shared radio frequency spectrum band.

In some examples, the transmitter component 730 may include at least one RF transmitter, such as at least one RF transmitter operable to transmit over the dedicated radio frequency spectrum band or the shared radio frequency spectrum band. The transmitter component 730 may in some cases include separate transmitters for the dedicated radio frequency spectrum band and the shared radio frequency spectrum band. The separate transmitters may, in some examples, take the form of an LTE/LTE-A transmitter component for communicating over the dedicated radio frequency spectrum band (e.g., LTE/LTE-A transmitter component for dedicated RF spectrum band 732), and an LTE/LTE-A transmitter component for communicating over the shared radio frequency spectrum band (e.g., LTE/LTE-A transmitter component for shared RF spectrum band 734). The transmitter component 730, including the LTE/LTE-A transmitter component for dedicated RF spectrum band 732 or the LTE/LTE-A transmitter component for shared RF spectrum band 734, may be used to transmit various types of data or control signals (i.e., transmissions) over one or more communication links of a wireless communication system, such as one or more communication links of the wireless communication system 100 or 200 described with reference to FIG. 1 or 2. The communication links may be established over the dedicated radio frequency spectrum band or the shared radio frequency spectrum band.

In some examples, the wireless communication management component 720 may be used to manage one or more aspects of wireless communication for the apparatus 705. In some examples, the wireless communication management component 720 may include a subframe configuration identification component 735, a CRS generation component 740, a CRS signaling component 745, a transmission management component 750, or a CCA component 780.

In some examples, the subframe configuration identification component 735 may be used to identify a configuration of a downlink subframe in the shared radio frequency spectrum band. In some examples, the downlink subframe may be configured to include at least one of: a data transmission for a UE, where the data transmission is based at least in part on a SFBC; a CRS-based CQI measurement subframe; a CRS-based eSIB; a transmission of a common search space grant in a self-scheduling mode; a transmission of a PCFICH; a transmission of a PFFICH, a transmission of a PDCCH; a transmission of a PHICH; or a transmission of a PBCH. The downlink subframe may also be configured to include other or alternative transmissions. When the downlink subframe is configured to include a CRS-based eSIB, the downlink subframe may be a D-CET subframe or the CRS-based eSIB may be one of a plurality of eSIBs transmitted on a periodic basis.

In some examples, the CRS generation component 740 may be used to generate, based at least in part on an identification made by the subframe configuration identification component 735, a CRS for a downlink subframe. For example, the CRS generation component 740 may generate a CRS for a downlink subframe when the configuration of the downlink subframe includes at least one of: a data transmission for a UE, where the data transmission is based at least in part on a SFBC; a CRS-based CQI measurement subframe; a CRS-based eSIB; a transmission of a common search space grant in a self-scheduling mode; a transmission of a PCFICH; a transmission of a PFFICH, a transmission of a PDCCH; a transmission of a PHICH; or a transmission of a PBCH.

In some examples, the CRS signaling component 745 may be used to signal a presence of a CRS in a downlink subframe. In some examples, signaling the presence of the CRS may include signaling the presence of the CRS in DCI included in a PDCCH or an ePDCCH on a carrier, where the signaling may be transmitted on a different carrier than the PDCCH/ePDCCH carrier. In some cases, signaling the presence of the CRS may be transmitted on a licensed carrier or an unlicensed carrier. When cross-carrier scheduling is used, one bit of DCI included in a PDCCH/ePDCCH may be used to signal the presence of the CRS. When self-scheduling is used, one bit of DCI included in an ePDCCH may be used to signal the presence of the CRS. The DCI may be decoded by a UE prior to decoding the CRS.

In some examples, the transmission management component 750 may be used to manage one or more aspects of transmitting a downlink subframe. In some examples, the downlink subframe may be transmitted as a first downlink subframe following winning contention for access to the shared radio frequency spectrum band. In some examples, the downlink subframe may be transmitted as a downlink subframe other than the first downlink subframe following winning contention for access to the shared radio frequency spectrum band. In some examples, the downlink subframe may be transmitted as a D-CET subframe.

In some examples, the transmission management component 750 may include a control transmission management component 755, a CRS transmission management component 760, a data transmission management component 765, a time and frequency resource selection component 770, or a power adjustment component 775.

In some examples, the control transmission management component 755 may be used to transmit, in a first set of at least one symbol period including a first symbol period of the downlink subframe, a control region including a PCFICH, a PFFICH, a PDCCH, or a PHICH. In some examples, the first set of at least one symbol period may also include at least a second symbol period of the downlink subframe, and the control region may be further transmitted in at least the second symbol period of the downlink subframe. The at least second symbol period of the downlink subframe may follow the first symbol period of the downlink subframe. In some examples, the first symbol period of the downlink subframe may be a temporally first symbol period of the downlink subframe.

In some examples, the control transmission management component 755 may include in a PCFICH an indication of whether the apparatus 705 will be active in a next downlink subframe subsequent to the downlink subframe. In some examples, the indication may include one extra bit in the PCFICH.

In some examples, the control transmission management component 755 may allocate at least one resource for the PHICH as a function of a UE grant starting resource block and an identifier of an uplink subframe. In some examples, the control transmission management component 755 may transmit in a PHICH a group acknowledgement for a group of uplink subframes received from a UE. In some examples, the group acknowledgement may be transmitted with a set of CRC bits. In some examples, the control transmission management component 755 may transmit in a first PHICH, in a first downlink subframe, a first group acknowledgement for a first group of uplink subframes received from a first UE, and transmit in a second PHICH, in a second downlink subframe, a second group acknowledgement for a second group of uplink subframes received from a second UE. The first group acknowledgement and the second group acknowledgement may be transmitted in different downlink subframes (e.g., the first downlink subframe or the second downlink subframe) because the first group of uplink subframes is received for a different TDD frame structure than the second group of uplink subframes. Stated differently, the downlink subframe in which a group acknowledgement is transmitted may be based at least in part on the TDD frame structure of the group of uplink subframes to which the group acknowledgement corresponds.

In some examples, the CRS transmission management component 760 may be used to transmit a CRS generated by the CRS generation component 740. When a downlink subframe is configured to include a PCFICH, a PFFICH, a PDCCH, or a PHICH, the CRS may be transmitted in a first symbol period of the downlink subframe. In alternative examples, the CRS may be transmitted in other symbol periods of the downlink subframe, in addition to or instead of the first symbol period of the downlink subframe.

In some examples, the data transmission management component 765 may be used to transmit a data region. The data region may be transmitted in a second set of at least one symbol period following a first set of at least one symbol period including a control region.

In some examples, the time and frequency resource selection component 770 may be used to select one or more time or frequency resources for satisfying a minimum bandwidth occupancy when transmitting the signals or symbols of a downlink subframe. For example, when the control transmission management component 755 transmits a control region in a first symbol period of a downlink subframe and at least a second symbol period of the downlink subframe, the time and frequency resource selection component 770 may be used to increase an aggregation level in at least the second symbol period. Also or alternatively, the time and frequency resource selection component 770 may be used to transmit a filler symbol over at least one tone in at least the second symbol period to satisfy a minimum bandwidth occupancy. In some examples, the filler symbol may include a symbol that is decodable or usable by a UE. In other examples, the filler symbol may include a junk symbol that is not decodable or not usable by a UE.

In some examples, the power adjustment component 775 may be used to adjust the transmit power of a transmitted downlink subframe. For example, when the control transmission management component 755 transmits a control region in a first symbol period of a downlink subframe and at least a second symbol period of the downlink subframe, the power adjustment component 775 may be used to boost a transmit power in at least the second symbol period to maintain a constant transmit power from the first symbol period to the at least second symbol period. In some examples, the transmit power in at least the second symbol period may be boosted because a CRS is transmitted in the first symbol period of the downlink subframe but not in at least the second symbol period of the downlink subframe. As another example, the power adjustment component 775 may be used to boost a transmit power in at least one symbol period in a control region to maintain a constant transmit power from the control region to a data region.

In some examples, the CCA component 780 may be used to contend for access to the shared radio frequency spectrum band. In some examples, the CCA component 780 may contend for access to the shared radio frequency spectrum band by performing a DCCA, as described, for example, with reference to FIG. 3. A DCCA may be performed for each of a number of component carriers. Upon winning a contention for access to the shared radio frequency spectrum band, for a component carrier in the shared radio frequency spectrum band, the CCA component 780 may enable the wireless communication management component 720 to transmit a CUBS on the component carrier in the second radio frequency spectrum band, and subsequently, enable the wireless communication management component 720 to transmit data or control signals on the component carrier in the shared radio frequency spectrum band.

In some examples, aspects of the apparatuses 605 and 705 described with reference to FIGS. 6 and 7 may be combined.

Figure 8:
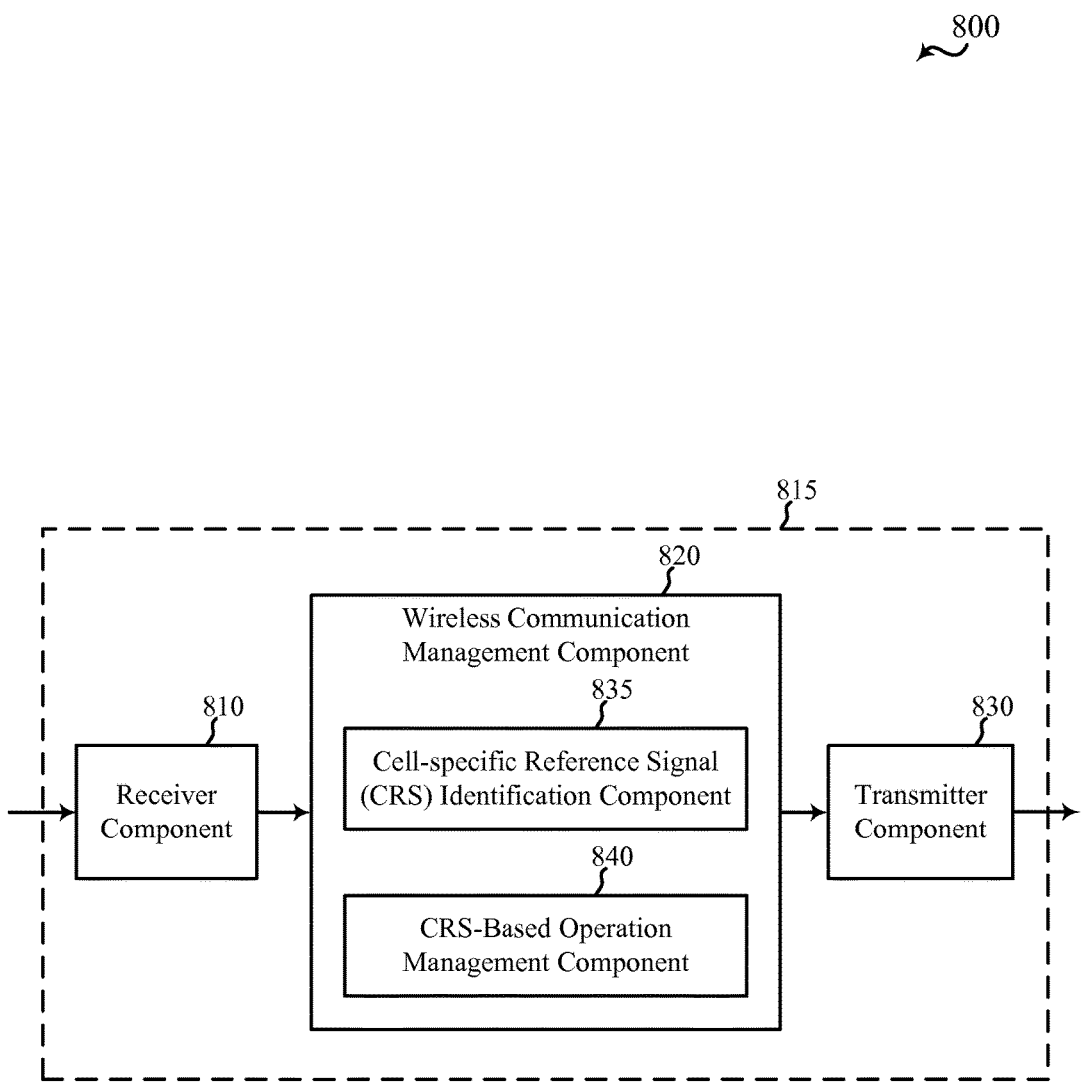
FIG. 8 shows a block diagram of an apparatus for use in wireless communication, in accordance with various aspects of the present disclosure.

FIG. 8 shows a block diagram 800 of an apparatus 815 for use in wireless communication, in accordance with various aspects of the present disclosure. The apparatus 815 may be an example of aspects of one or more of the UEs 115, 215, 215-*a*, 215-*b*, or 215-*c* described with reference to FIG. 1 or 2. The apparatus 815 may also be or include a processor. The apparatus 815 may include a receiver component 810, a wireless communication management component 820, or a transmitter component 830. Each of these components may be in communication with each other.

The components of the apparatus 815 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each component may also be implemented, in whole or in part, with instructions embodied in a memory, formatted to be executed by one or more general or application-specific processors.

In some examples, the receiver component 810 may include at least one RF receiver, such as at least one RF receiver operable to receive transmissions over a dedicated radio frequency spectrum band (e.g., a radio frequency spectrum band for which transmitting apparatuses may not contend for access because the radio frequency spectrum band is licensed to a subset of users for various uses, such as a licensed radio frequency spectrum band usable for LTE/LTE-A communications) or a shared radio frequency spectrum band (e.g., a radio frequency spectrum band for which transmitting apparatuses may need to contend for access (e.g., a radio frequency spectrum band that is available for unlicensed use, such as Wi-Fi use, or a radio frequency spectrum band that is available for use by multiple operators in an equally shared or prioritized manner)). In some examples, the dedicated radio frequency spectrum band or the shared radio frequency spectrum band may be used for LTE/LTE-A communications, as described, for example, with reference to FIG. 1, 2, 3, 4, or 5. The receiver component 810 may be used to receive various types of data or control signals (i.e., transmissions) over one or more communication links of a wireless communication system, such as one or more communication links of the wireless communication system 100 or 200 described with reference to FIG. 1 or 2. The communication links may be established over the first radio frequency spectrum band or the second radio frequency spectrum band.

In some examples, the transmitter component 830 may include at least one RF transmitter, such as at least one RF transmitter operable to transmit over the dedicated radio frequency spectrum band or the shared radio frequency spectrum band. The transmitter component 830 may be used to transmit various types of data or control signals (i.e., transmissions) over one or more communication links of a wireless communication system, such as one or more communication links of the wireless communication system 100 or 200 described with reference to FIG. 1 or 2. The communication links may be established over the dedicated radio frequency spectrum band or the shared radio frequency spectrum band.

In some examples, the wireless communication management component 820 may be used to manage one or more aspects of wireless communication for the apparatus 815. In some examples, the wireless communication management component 820 may include a CRS identification component 835 or a CRS-based operation management component 840.

In some examples, the CRS identification component 835 may be used to dynamically determine a presence of a CRS in a downlink subframe in a shared radio frequency spectrum band.

In some examples, the CRS-based operation management component 840 may be used to perform at least one operation during a downlink subframe, in response to a dynamic determination made by the CRS identification component 835.

Figure 9:
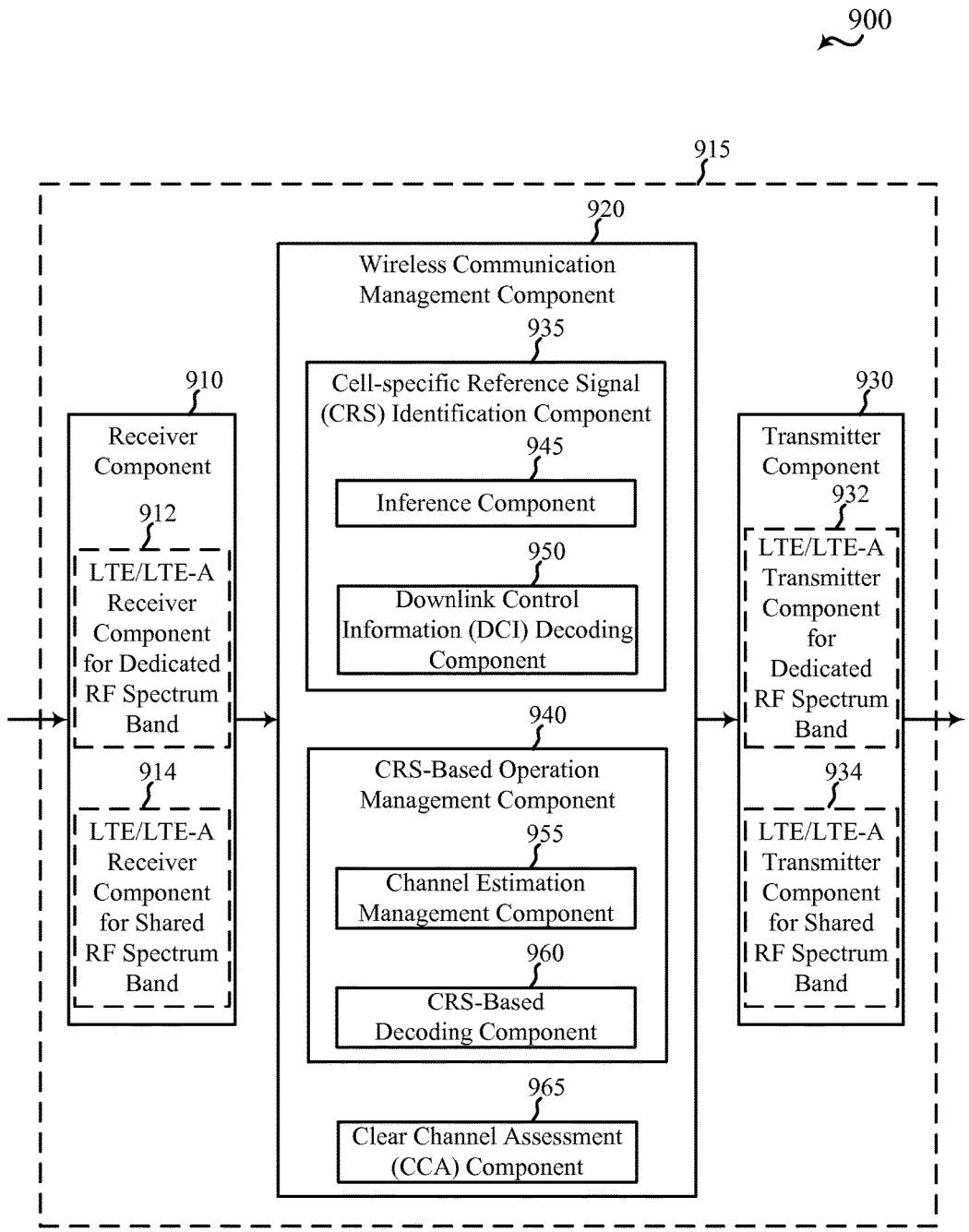
FIG. 9 shows a block diagram of an apparatus for use in wireless communication, in accordance with various aspects of the present disclosure.

FIG. 9 shows a block diagram 900 of an apparatus 915 for use in wireless communication, in accordance with various aspects of the present disclosure. The apparatus 915 may be an example of aspects of one or more of the UEs 115, 215, 215-*a*, 215-*b*, or 215-*c* described with reference to FIG. 1 or 2, or aspects of the apparatus 815 described with reference to FIG. 8. The apparatus 915 may also be or include a processor. The apparatus 915 may include a receiver component 910, a wireless communication management component 920, or a transmitter component 930. Each of these components may be in communication with each other.

The components of the apparatus 915 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each component may also be implemented, in whole or in part, with instructions embodied in a memory, formatted to be executed by one or more general or application-specific processors.

In some examples, the receiver component 910 may include at least one RF receiver, such as at least one RF receiver operable to receive transmissions over a dedicated radio frequency spectrum band (e.g., a radio frequency spectrum band for which transmitting apparatuses may not contend for access because the radio frequency spectrum band is licensed to a subset of users for various uses, such as a licensed radio frequency spectrum band usable for LTE/LTE-A communications) or a shared radio frequency spectrum band (e.g., a radio frequency spectrum band for which transmitting apparatuses may need to contend for access (e.g., a radio frequency spectrum band that is available for unlicensed use, such as Wi-Fi use, or a radio frequency spectrum band that is available for use by multiple operators in an equally shared or prioritized manner)). In some examples, the dedicated radio frequency spectrum band or the shared radio frequency spectrum band may be used for LTE/LTE-A communications, as described, for example, with reference to FIG. 1 or 2. The receiver component 910 may in some cases include separate receivers for the dedicated radio frequency spectrum band and the shared radio frequency spectrum band. The separate receivers may, in some examples, take the form of an LTE/LTE-A receiver component for communicating over the dedicated radio frequency spectrum band (e.g., LTE/LTE-A receiver component for dedicated RF spectrum band 912), and an LTE/LTE-A receiver component for communicating over the shared radio frequency spectrum band (e.g., LTE/LTE-A receiver component for shared RF spectrum band 914). The receiver component 910, including the LTE/LTE-A receiver component for dedicated RF spectrum band 912 or the LTE/LTE-A receiver component for shared RF spectrum band 914, may be used to receive various types of data or control signals (i.e., transmissions) over one or more communication links of a wireless communication system, such as one or more communication links of the wireless communication system 100 or 200 described with reference to FIG. 1 or 2. The communication links may be established over the dedicated radio frequency spectrum band or the shared radio frequency spectrum band.

In some examples, the transmitter component 930 may include at least one RF transmitter, such as at least one RF transmitter operable to transmit over the dedicated radio frequency spectrum band or the shared radio frequency spectrum band. The transmitter component 930 may in some cases include separate transmitters for the dedicated radio frequency spectrum band and the shared radio frequency spectrum band. The separate transmitters may, in some examples, take the form of an LTE/LTE-A transmitter component for communicating over the dedicated radio frequency spectrum band (e.g., LTE/LTE-A transmitter component for dedicated RF spectrum band 932), and an LTE/LTE-A transmitter component for communicating over the shared radio frequency spectrum band (e.g., LTE/LTE-A transmitter component for shared RF spectrum band 934). The transmitter component 930, including the LTE/LTE-A transmitter component for dedicated RF spectrum band 932 or the LTE/LTE-A transmitter component for shared RF spectrum band 934, may be used to transmit various types of data or control signals (i.e., transmissions) over one or more communication links of a wireless communication system, such as one or more communication links of the wireless communication system 100 or 200 described with reference to FIG. 1 or 2. The communication links may be established over the dedicated radio frequency spectrum band or the shared radio frequency spectrum band.

In some examples, the wireless communication management component 920 may be used to manage one or more aspects of wireless communication for the apparatus 915. In some examples, the wireless communication management component 920 may include a CRS identification component 935, a CRS-based operation management component 940, or a CCA component 965.

In some examples, the CRS identification component 935 may be used to dynamically determine a presence of a CRS in a downlink subframe in a shared radio frequency spectrum band. In some examples, the CRS identification component 935 may include an inference component 945 or a DCI decoding component 950.

In some examples, the inference component 945 may be used to infer the presence of a CRS in at least one of: a CQI measurement subframe or a subframe including an eSIB. In some examples, the subframe including the eSIB may be a D-CET subframe, or the eSIB may be one of a plurality of eSIBs received on a periodic basis.

In some examples, the DCI decoding component 950 may be used to decode DCI received in a PDCCH or an ePDCCH. When cross-carrier scheduling is used, decoding the DCI may include decoding one bit of DCI included in a PDCCH/ePDCCH. When self-scheduling is used, decoding the DCI may include decoding one bit of DCI included in an ePDCCH. The DCI may be decoded by a UE prior to decoding the CRS.

In some examples, the CRS-based operation management component 940 may be used to perform at least one operation during a downlink subframe, in response to a dynamic determination made by the CRS identification component 935. In some examples, the CRS-based operation management component 940 may include a channel estimation management component 955 or a CRS-based decoding component 960.

In some examples, the channel estimation management component 955 may be used to perform a measurement on a CRS to obtain a channel estimation.

In some examples, the CRS-based decoding component 960 may be used to decode, based at least in part on the channel estimation, at least one of: a PCFICH, a PFFICH, a PDCCH, a PHICH, a PBCH, or an eSIB. In some examples, the eSIB may be included in a D-CET subframe, or the eSIB may be one of a plurality of eSIBs received on a periodic basis.

In some examples, the CRS-based operation management component 940 or CRS-based decoding component 960 may be used to receive, in a PCFICH, an indication of whether a base station will be active in a next downlink subframe subsequent to the downlink subframe. In some examples, the indication may include one extra bit in the PCFICH. In some examples, the CRS-based operation management component 940 or CRS-based decoding component 960 may be used to receive, in a PHICH, a group acknowledgement for a group of uplink subframes. In some examples, a group acknowledgement may be received with a set of CRC bits.

In some examples, the CRS-based operation management component 940 or CRS-based decoding component 960 may be used to infer a presence of a PHICH in a downlink subframe based at least in part on a TDD frame structure of a frame in which the downlink subframe is included. The CRS-based operation management component 940 or CRS-based decoding component 960 may then be used to receive (e.g., decode) a transmission of the PHICH during the downlink subframe.

In some examples, the CCA component 965 may be used to contend for access to the shared radio frequency spectrum band. In some examples, the CCA component 965 may contend for access to the shared radio frequency spectrum band by performing a UCCA, as described, for example, with reference to FIG. 3. A UCCA may be performed for each of a number of component carriers. Upon winning a contention for access to the shared radio frequency spectrum band, for a component carrier in the shared radio frequency spectrum band, the CCA component 965 may enable the wireless communication management component 920 to transmit a CUBS on the component carrier in the second radio frequency spectrum band, and subsequently, enable the wireless communication management component 920 to transmit data or control signals on the component carrier in the shared radio frequency spectrum band.

In some examples, aspects of the apparatuses 815 and 915 described with reference to FIGS. 8 and 9 may be combined.

Figure 10:
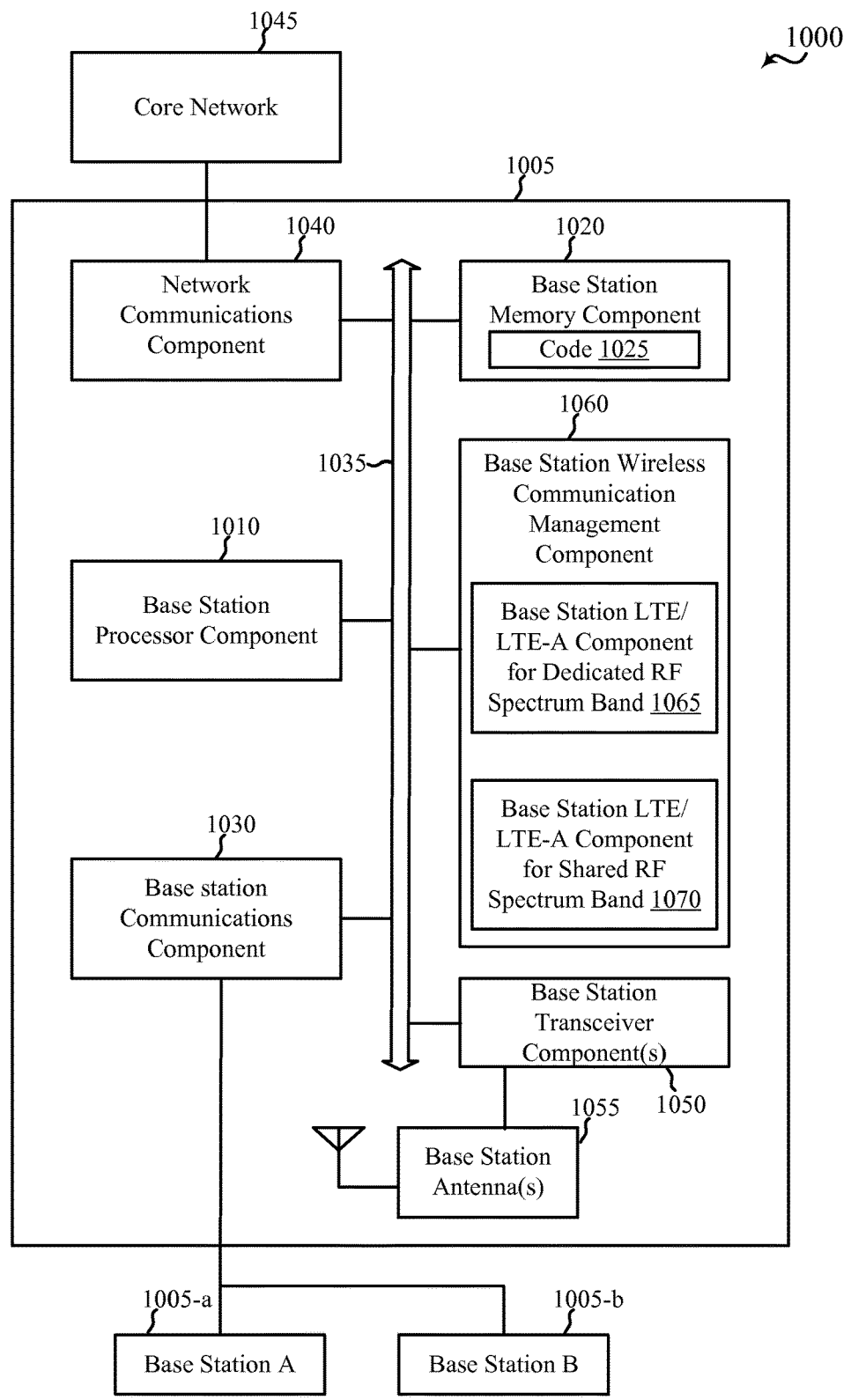
FIG. 10 shows a block diagram of a base station (e.g., a base station forming part or all of an eNB) for use in wireless communication, in accordance with various aspects of the present disclosure.

FIG. 10 shows a block diagram 1000 of a base station 1005 (e.g., a base station forming part or all of an eNB) for use in wireless communication, in accordance with various aspects of the present disclosure. In some examples, the base station 1005 may be an example of one or more aspects of the base station 105, 205, or 205-*a* described with reference to FIG. 1 or 2, or aspects of the apparatus 605 or 705 described with reference to FIG. 6 or 7. The base station 1005 may be configured to implement or facilitate at least some of the base station features and functions described with reference to FIG. 1, 2, 3, 4, 5, 6, or 7.

The base station 1005 may include a base station processor component 1010, a base station memory component 1020, at least one base station transceiver component (represented by base station transceiver component(s) 1050), at least one base station antenna (represented by base station antenna(s) 1055), or a base station wireless communication management component 1060. The base station 1005 may also include one or more of a base station communications component 1030 or a network communications component 1040. Each of these components may be in communication with each other, directly or indirectly, over one or more buses 1035.

The base station memory component 1020 may include random access memory (RAM) or read-only memory (ROM). The base station memory component 1020 may store computer-readable, computer-executable code 1025 containing instructions that are configured to, when executed, cause the base station processor component 1010 to perform various functions described herein related to wireless communication, including, for example, identifying a configuration of a downlink subframe in a shared radio frequency spectrum band, and generating, based at least in part on the configuration of the downlink subframe, a CRS for the downlink subframe. Alternatively, the code 1025 may not be directly executable by the base station processor component 1010 but be configured to cause the base station 1005 (e.g., when compiled and executed) to perform various of the functions described herein.

The base station processor component 1010 may include an intelligent hardware device, e.g., a central processing unit (CPU), a microcontroller, an ASIC, etc. The base station processor component 1010 may process information received through the base station transceiver component(s) 1050, the base station communications component 1030, or the network communications component 1040. The base station processor component 1010 may also process information to be sent to the transceiver component(s) 1050 for transmission through the antenna(s) 1055, to the base station communications component 1030, for transmission to one or more other base stations 1005-*a* and 1005-*b*, or to the network communications component 1040 for transmission to a core network 1045, which may be an example of one or more aspects of the core network 130 described with reference to FIG. 1. The base station processor component 1010 may handle, alone or in connection with the base station wireless communication management component 1060, various aspects of communicating over (or managing communications over) a dedicated radio frequency spectrum band (e.g., a radio frequency spectrum band for which apparatuses do not contend for access because the radio frequency spectrum band is licensed to a subset of users for various uses, such as a licensed radio frequency spectrum band usable for LTE/LTE-A communications) or a shared radio frequency spectrum band (e.g., a radio frequency spectrum band for which transmitting apparatuses may need to contend for access (e.g., a radio frequency spectrum band that is available for unlicensed use, such as Wi-Fi use, or a radio frequency spectrum band that is available for use by multiple operators in an equally shared or prioritized manner)).

The base station transceiver component(s) 1050 may include a modem configured to modulate packets and provide the modulated packets to the base station antenna(s) 1055 for transmission, and to demodulate packets received from the base station antenna(s) 1055. The base station transceiver component(s) 1050 may, in some examples, be implemented as one or more base station transmitter components and one or more separate base station receiver components. The base station transceiver component(s) 1050 may support communications in the dedicated radio frequency spectrum band or the shared radio frequency spectrum band. The base station transceiver component(s) 1050 may be configured to communicate bi-directionally, via the antenna(s) 1055, with one or more UEs or apparatuses, such as one or more of the UEs 115, 215, 215-*a*, 215-*b*, or 215-*c* described with reference to FIG. 1 or 2, or one or more of the apparatuses 615 or 715 described with reference to FIG. 6 or 7. The base station 1005 may, for example, include multiple base station antennas 1055 (e.g., an antenna array). The base station 1005 may communicate with the core network 1045 through the network communications component 1040. The base station 1005 may also communicate with other base stations, such as the base stations 1005-*a* and 1005-*b*, using the base station communications component 1030.

The base station wireless communication management component 1060 may be configured to perform or control some or all of the features or functions described with reference to FIG. 1, 2, 3, 4, 5, 6, or 7 related to wireless communication over the dedicated radio frequency spectrum band or the shared radio frequency spectrum band. For example, the base station wireless communication management component 1060 may be configured to support a supplemental downlink mode, a carrier aggregation mode, or a standalone mode using the dedicated radio frequency spectrum band or the shared radio frequency spectrum band. The base station wireless communication management component 1060 may include a base station LTE/LTE-A component for dedicated RF spectrum band 1065 configured to handle LTE/LTE-A communications in the dedicated radio frequency spectrum band, and a base station LTE/LTE-A component for shared RF spectrum band 1070 configured to handle LTE/LTE-A communications in the shared radio frequency spectrum band. The base station wireless communication management component 1060, or portions of it, may include a processor, or some or all of the functions of the base station wireless communication management component 1060 may be performed by the base station processor component 1010 or in connection with the base station processor component 1010. In some examples, the base station wireless communication management component 1060 may be an example of the wireless communication management component 620 or 720 described with reference to FIG. 6 or 7.

Figure 11:
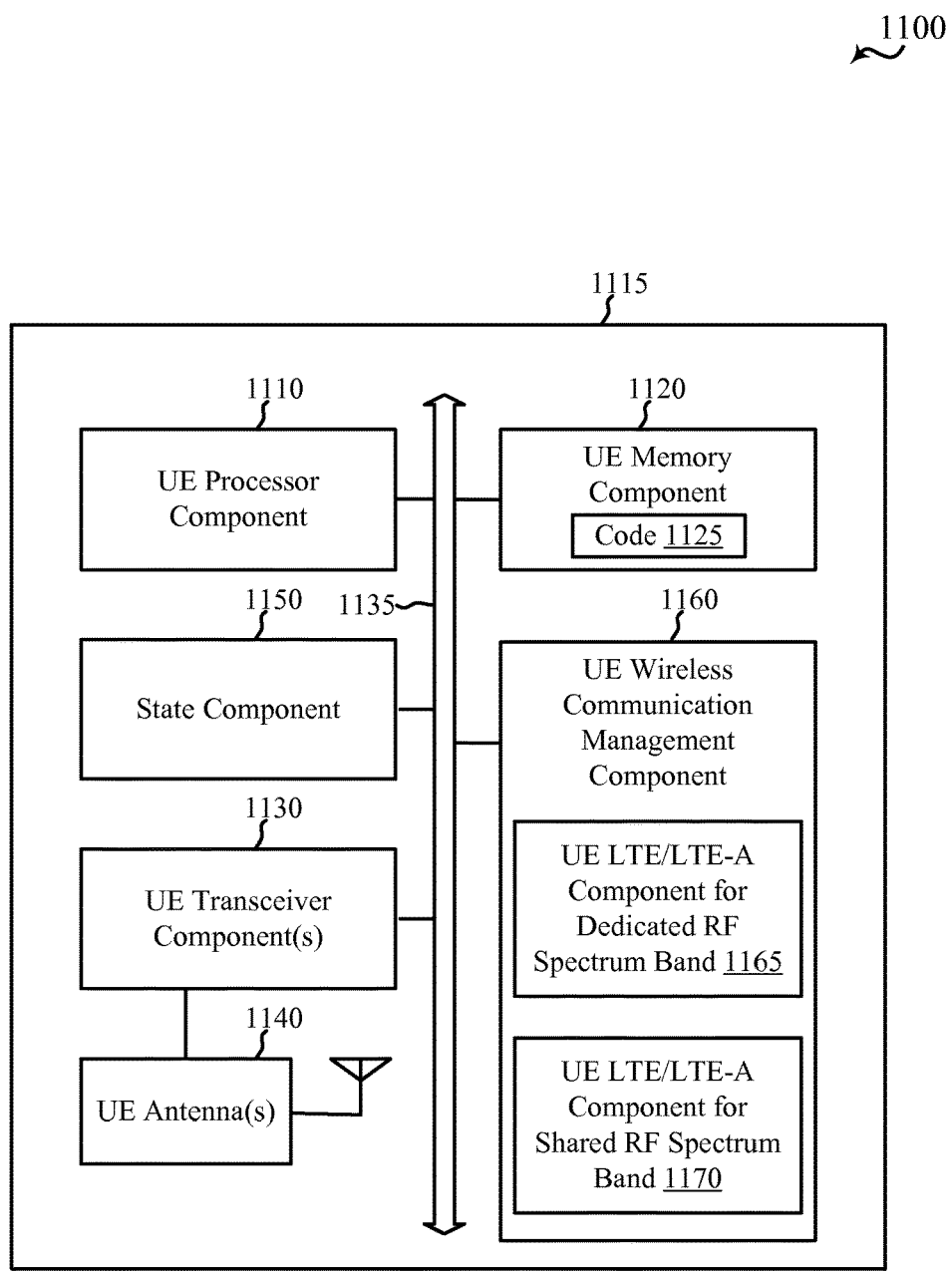
FIG. 11 shows a block diagram of a UE for use in wireless communication, in accordance with various aspects of the present disclosure.

FIG. 11 shows a block diagram 1100 of a UE 1115 for use in wireless communication, in accordance with various aspects of the present disclosure. The UE 1115 may have various configurations and may be included or be part of a personal computer (e.g., a laptop computer, a netbook computer, a tablet computer, etc.), a cellular telephone, a PDA, a digital video recorder (DVR), an internet appliance, a gaming console, an e-reader, etc. The UE 1115 may, in some examples, have an internal power supply (not shown), such as a small battery, to facilitate mobile operation. In some examples, the UE 1115 may be an example of aspects of one or more of the UE 115, 215, 215-*a*, 215-*b*, or 215-*c* described with reference to FIG. 1 or 2, or aspects of one or more of the apparatuses 815 or 915 described with reference to FIG. 8 or 9. The UE 1115 may be configured to implement at least some of the UE or apparatus features and functions described with reference to FIG. 1, 2, 3, 4, 5, 8, or 9.

The UE 1115 may include a UE processor component 1110, a UE memory component 1120, at least one UE transceiver component (represented by UE transceiver component(s) 1130), at least one UE antenna (represented by UE antenna(s) 1140), or a UE wireless communication management component 1160. Each of these components may be in communication with each other, directly or indirectly, over one or more buses 1135.

The UE memory component 1120 may include RAM or ROM. The UE memory component 1120 may store computer-readable, computer-executable code 1125 containing instructions that are configured to, when executed, cause the UE processor component 1110 to perform various functions described herein related to wireless communication, including, for example, dynamically determining a presence of a CRS in a downlink subframe in a shared radio frequency spectrum band, and performing at least one operation during the downlink subframe in response to the dynamic determination. Alternatively, the code 1125 may not be directly executable by the UE processor component 1110 but be configured to cause the UE 1115 (e.g., when compiled and executed) to perform various of the functions described herein.

The UE processor component 1110 may include an intelligent hardware device, e.g., a CPU, a microcontroller, an ASIC, etc. The UE processor component 1110 may process information received through the UE transceiver component(s) 1130 or information to be sent to the UE transceiver component(s) 1130 for transmission through the UE antenna(s) 1140. The UE processor component 1110 may handle, alone or in connection with the UE wireless communication management component 1160, various aspects of communicating over (or managing communications over) a dedicated radio frequency spectrum band (e.g., a radio frequency spectrum band for which apparatuses do not contend for access because the radio frequency spectrum band is licensed to a subset of users for various uses, such as a licensed radio frequency spectrum band usable for LTE/LTE-A communications) or a shared radio frequency spectrum band (e.g., a radio frequency spectrum band for which transmitting apparatuses may need to contend for access (e.g., a radio frequency spectrum band that is available for unlicensed use, such as Wi-Fi use, or a radio frequency spectrum band that is available for use by multiple operators in an equally shared or prioritized manner)).

The UE transceiver component(s) 1130 may include a modem configured to modulate packets and provide the modulated packets to the UE antenna(s) 1140 for transmission, and to demodulate packets received from the UE antenna(s) 1140. The UE transceiver component(s) 1130 may, in some examples, be implemented as one or more UE transmitter components and one or more separate UE receiver components. The UE transceiver component(s) 1130 may support communications in the licensed radio frequency spectrum band or the unlicensed radio frequency spectrum band. The UE transceiver component(s) 1130 may be configured to communicate bi-directionally, via the UE antenna(s) 1140, with one or more of the base stations 105, 205, 205-*a*, or 1005 described with reference to FIG. 1, 2, or 10, or the apparatus 605 or 705 described with reference to FIG. 6 or 7. While the UE 1115 may include a single UE antenna, there may be examples in which the UE 1115 may include multiple UE antennas 1140.

The UE state component 1150 may be used, for example, to manage transitions of the UE 1115 between an radio resource control (RRC) idle state and an RRC connected state, and may be in communication with other components of the UE 1115, directly or indirectly, over the one or more buses 1135. The UE state component 1150, or portions of it, may include a processor, or some or all of the functions of the UE state component 1150 may be performed by the UE processor component 1110 or in connection with the UE processor component 1110.

The UE wireless communication management component 1160 may be configured to perform or control some or all of the UE or apparatus features or functions described with reference to FIG. 1, 2, 3, 4, 5, 8, or 9 related to wireless communication over the dedicated radio frequency spectrum band or the shared radio frequency spectrum band. For example, the UE wireless communication management component 1160 may be configured to support a supplemental downlink mode, a carrier aggregation mode, or a standalone mode using the dedicated radio frequency spectrum band or the shared radio frequency spectrum band. The UE wireless communication management component 1160 may include a UE LTE/LTE-A component for dedicated RF spectrum band 1165 configured to handle LTE/LTE-A communications in the dedicated radio frequency spectrum band, and a UE LTE/LTE-A component for shared RF spectrum band 1170 configured to handle LTE/LTE-A communications in the shared radio frequency spectrum band. The UE wireless communication management component 1160, or portions of it, may include a processor, or some or all of the functions of the UE wireless communication management component 1160 may be performed by the UE processor component 1110 or in connection with the UE processor component 1110. In some examples, the UE wireless communication management component 1160 may be an example of the wireless communication management component 820 or 920 described with reference to FIG. 8 or 9.

Figure 12:
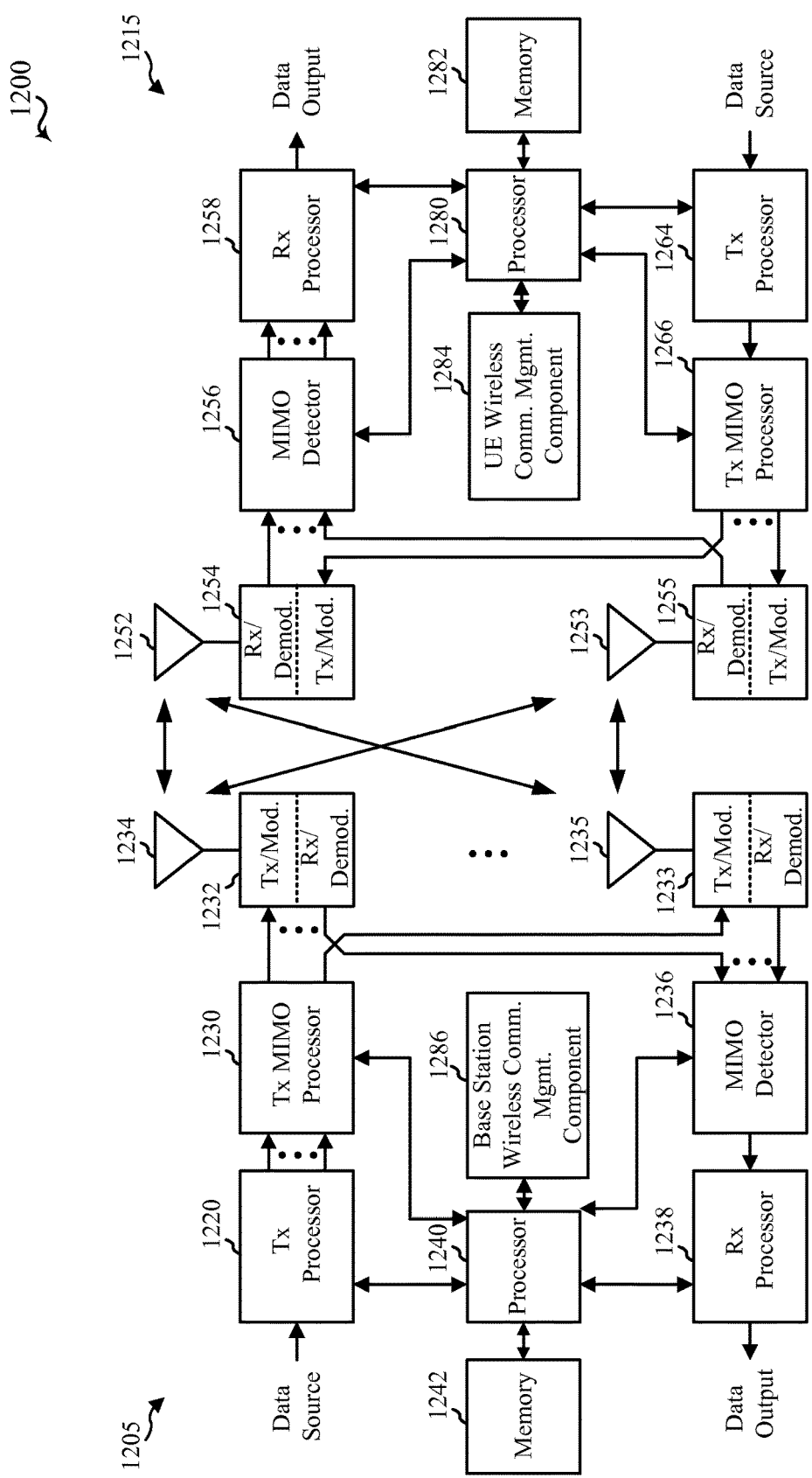
FIG. 12 is a block diagram of MIMO communication system including a base station and a UE, in accordance with various aspects of the present disclosure.

FIG. 12 is a block diagram of a MIMO communication system 1200 including a base station 1205 and a UE 1215, in accordance with various aspects of the present disclosure. The MIMO communication system 1200 may illustrate aspects of the wireless communication system 100 or 200 described with reference to FIG. 1 or 2. The base station 1205 may be an example of aspects of the base station 105, 205, 205-a, or 1005 described with reference to FIG. 1, 2, or 10, or aspects of the apparatus 605 or 705 described with reference to FIG. 6 or 7. The base station 1205 may be equipped with antennas 1234 through 1235, and the UE 1215 may be equipped with antennas 1252 through 1253. In the MIMO communication system 1200, the base station 1205 may be able to send data over multiple communication links at the same time. Each communication link may be called a "layer" and the "rank" of the communication link may indicate the number of layers used for communication. For example, in a 2×2 MIMO communications system where base station 1205 transmits two "layers," the rank of the communication link between the base station 1205 and the UE 1215 is two.

At the base station 1205, a transmit (Tx) processor 1220 may receive data from a data source. The transmit processor 1220 may process the data. The transmit processor 1220 may also generate control symbols or reference symbols. A transmit MIMO processor 1230 may perform spatial processing (e.g., precoding) on data symbols, control symbols, or reference symbols, if applicable, and may provide output symbol streams to the transmit modulators 1232 through 1233. Each modulator 1232 through 1233 may process a respective output symbol stream (e.g., for OFDM, etc.) to obtain an output sample stream. Each modulator 1232 through 1233 may further process (e.g., convert to analog, amplify, filter, and upconvert) the output sample stream to obtain a DL signal. In one example, DL signals from modulators 1232 through 1233 may be transmitted via the antennas 1234 through 1235, respectively.

The UE 1215 may be an example of aspects of the UE 115, 215, 215-a, 215-b, 215-c, or 1115 described with reference to FIG. 1, 2, or 11, or aspects of the apparatus 815 or 915 described with reference to FIG. 8 or 9. At the UE 1215, the UE antennas 1252 through 1253 may receive the DL signals from the base station 1205 and may provide the received signals to the modulator/demodulators 1254 through 1255, respectively. Each modulator/demodulator 1254 through 1255 may condition (e.g., filter, amplify, downconvert, and digitize) a respective received signal to obtain input samples. Each modulator/demodulator 1254 through 1255 may further process the input samples (e.g., for OFDM, etc.) to obtain received symbols. A MIMO detector 1256 may obtain received symbols from all the modulator/demodulators 1254 through 1255, perform MIMO detection on the received symbols, if applicable, and provide detected symbols. A receive (Rx) processor 1258 may process (e.g., demodulate, deinterleave, and decode) the detected symbols, providing decoded data for the UE 1215 to a data output, and provide decoded control information to a processor 1280, or memory 1282.

The processor 1280 may in some cases execute stored instructions to instantiate a UE wireless communication management component 1284. The UE wireless communication management component 1284 may be an example of aspects of the wireless communication management component 820, 920, or 1120 described with reference to FIG. 8, 9, or 11.

On the uplink (UL), at the UE 1215, a transmit processor 1264 may receive and process data from a data source. The transmit processor 1264 may also generate reference symbols for a reference signal. The symbols from the transmit processor 1264 may be precoded by a transmit MIMO processor 1266 if applicable, further processed by the modulator/demodulators 1254 through 1255 (e.g., for SC-FDMA, etc.), and be transmitted to the base station 1205 in accordance with the transmission parameters received from the base station 1205. At the base station 1205, the UL signals from the UE 1215 may be received by the antennas 1234 through 1235, processed by the demodulators 1232 through 1233, detected by a MIMO detector 1236 if applicable, and further processed by a receive processor 1238. The receive processor 1238 may provide decoded data to a data output and to the processor 1240 or memory 1242.

The processor 1240 may in some cases execute stored instructions to instantiate a base station wireless communication management component 1286. The base station wireless communication management component 1286 may be an example of aspects of the wireless communication management component 620, 720, or 1060 described with reference to FIG. 6, 7, or 10.

The components of the UE 1215 may, individually or collectively, be implemented with one or more ASICs adapted to perform some or all of the applicable functions in hardware. Each of the noted components may be a means for performing one or more functions related to operation of the MIMO communication system 1200. Similarly, the components of the base station 1205 may, individually or collectively, be implemented with one or more ASICs adapted to perform some or all of the applicable functions in hardware. Each of the noted components may be a means for performing one or more functions related to operation of the MIMO communication system 1200.

Figure 13:
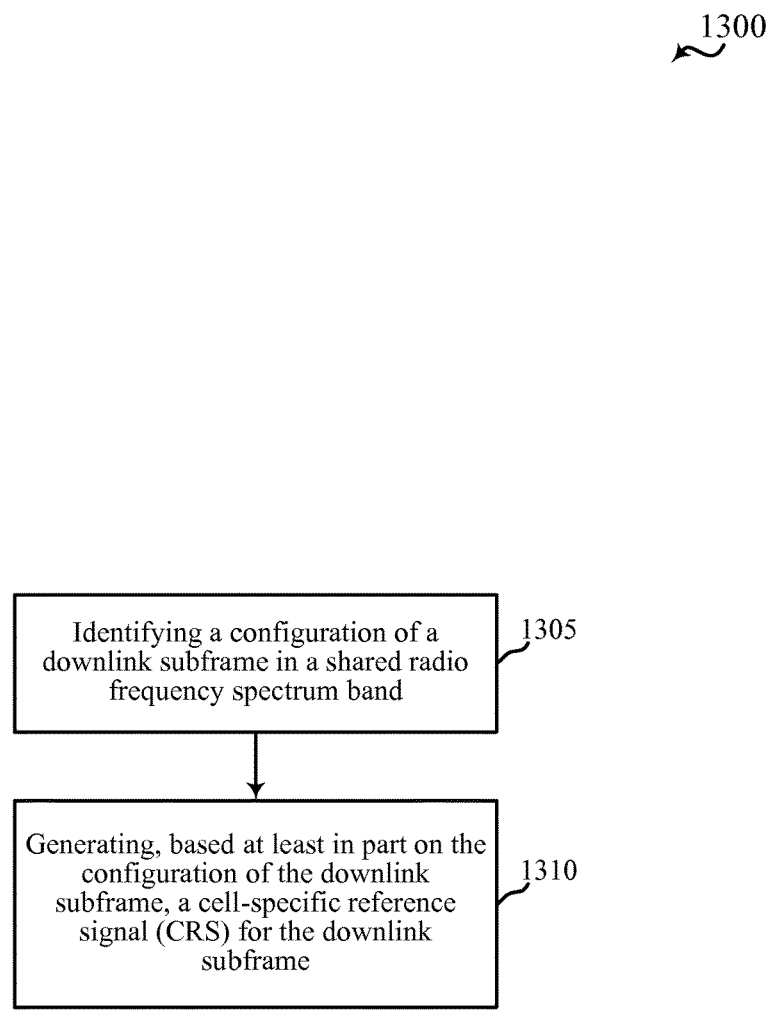
FIG. 13 is a flow chart illustrating an exemplary method for wireless communication, in accordance with various aspects of the present disclosure.

FIG. 13 is a flow chart illustrating an exemplary method 1300 for wireless communication, in accordance with various aspects of the present disclosure. For clarity, the method 1300 is described below with reference to aspects of one or more of the base stations 105, 205, 205-a, 1005, or 1205 described with reference to FIG. 1, 2, 10, or 12, or aspects of one or more of the apparatuses 605 or 705 described with reference to FIG. 6 or 7. In some examples, a base station or apparatus may execute one or more sets of codes to control the functional elements of the base station or apparatus to perform the functions described below. Additionally or alternatively, the base station or apparatus may perform one or more of the functions described below using special-purpose hardware.

At block 1305, the method 1300 may include identifying a configuration of a downlink subframe in a shared radio frequency spectrum band. In some examples, the downlink subframe may be configured to include at least one of: a data transmission for a UE, the data transmission based at least in part on a SFBC; a CRS-based CQI measurement subframe; a CRS-based eSIB; a transmission of a common search space grant in a self-scheduling mode; a transmission of a PCFICH; a transmission of a PFFICH, a transmission of a PDCCH; a transmission of a PHICH; or a transmission of a PBCH. The downlink subframe may also be configured to include other or alternative transmissions. When the downlink subframe is configured to include a CRS-based eSIB, the downlink subframe may be a D-CET subframe or the CRS-based eSIB may be one of a plurality of eSIBs transmitted on a periodic basis. The shared radio frequency spectrum band may include a radio frequency spectrum band for which transmitting apparatuses may need to contend for access (e.g., a radio frequency spectrum band that is available for unlicensed use, such as Wi-Fi use, or a radio frequency spectrum band that is available for use by multiple operators in an equally shared or prioritized manner). The operation(s) at block 1305 may be performed using the wireless communication management component 620, 720, 1060, or 1286 described with reference to FIG. 6, 7, 10, or 12, or the subframe configuration identification component 635 or 735 described with reference to FIG. 6 or 7.

At block 1310, the method 1300 may include generating, based at least in part on the configuration of the downlink subframe, a CRS for the downlink subframe. For example, the method 1300 may include generating the CRS for the downlink subframe when the configuration of the downlink subframe includes at least one of: the data transmission for the UE, where the data transmission is based at least in part on the SFBC; the CRS-based CQI measurement subframe; the CRS-based eSIB; the transmission of the common search space grant in the self-scheduling mode; the transmission of the PCFICH; the transmission of the PFFICH, the transmission of the PDCCH; the transmission of the PHICH; or the transmission of the PBCH. The operation(s) at block 1310 may be performed using the wireless communication management component 620, 720, 1060, or 1286 described with reference to FIG. 6, 7, 10, or 12, or the CRS generation component 640 or 740 described with reference to FIG. 6 or 7.

Thus, the method 1300 may provide for wireless communication. It should be noted that the method 1300 is just one implementation and that the operations of the method 1300 may be rearranged or otherwise modified such that other implementations are possible.

Figure 14:
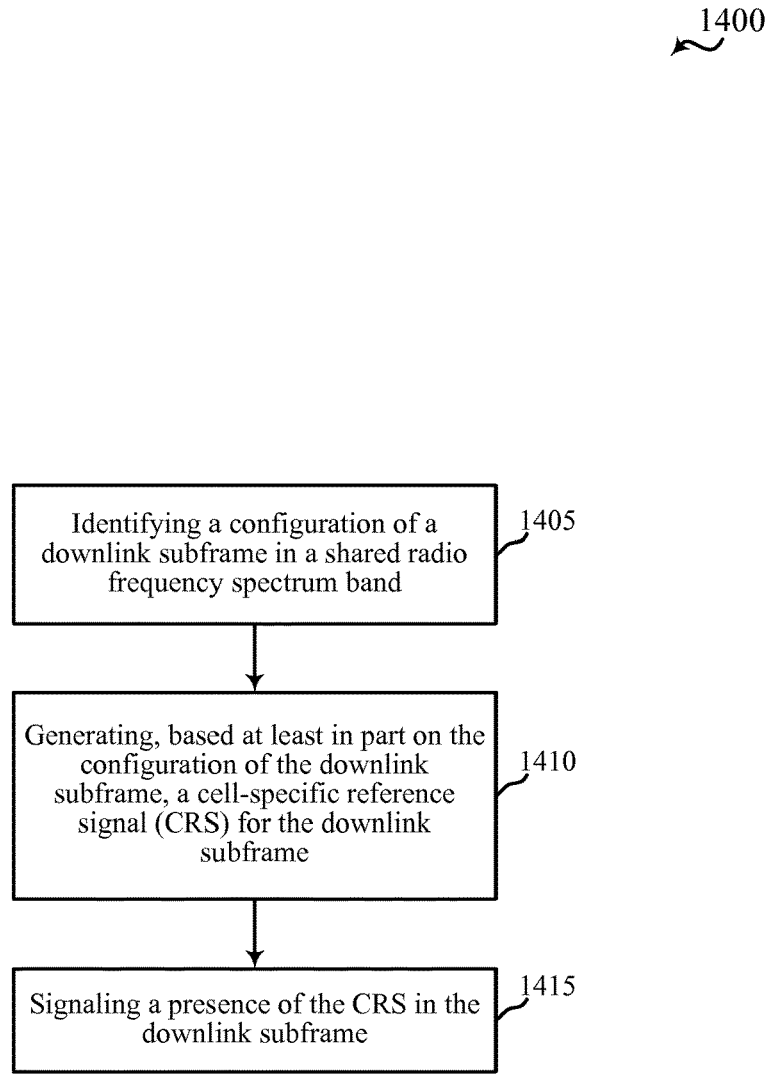
FIG. 14 is a flow chart illustrating an exemplary method for wireless communication, in accordance with various aspects of the present disclosure.

FIG. 14 is a flow chart illustrating an exemplary method 1400 for wireless communication, in accordance with various aspects of the present disclosure. For clarity, the method 1400 is described below with reference to aspects of one or more of the base stations 105, 205, 205-a, 1005, or 1205 described with reference to FIG. 1, 2, 10, or 12, or aspects of one or more of the apparatuses 605 or 705 described with reference to FIG. 6 or 7. In some examples, a base station or apparatus may execute one or more sets of codes to control the functional elements of the base station or apparatus to perform the functions described below. Additionally or alternatively, the base station or apparatus may perform one or more of the functions described below using special-purpose hardware.

At block 1405, the method 1400 may include identifying a configuration of a downlink subframe in a shared radio frequency spectrum band. In some examples, the downlink subframe may be configured to include at least one of: a data transmission for a UE, the data transmission based at least in part on a SFBC; a CRS-based CQI measurement subframe; a CRS-based eSIB; a transmission of a common search space grant in a self-scheduling mode; a transmission of a PCFICH; a transmission of a PFFICH, a transmission of a PDCCH; a transmission of a PHICH; or a transmission of a PBCH. When the downlink subframe is configured to include a CRS-based eSIB, the downlink subframe may be a D-CET subframe or the CRS-based eSIB may be one of a plurality of eSIBs transmitted on a periodic basis. The downlink subframe may also be configured to include other or alternative transmissions. The shared radio frequency spectrum band may include a radio frequency spectrum band for which transmitting apparatuses may need to contend for access (e.g., a radio frequency spectrum band that is available for unlicensed use, such as Wi-Fi use, or a radio frequency spectrum band that is available for use by multiple operators in an equally shared or prioritized manner). The operation(s) at block 1405 may be performed using the wireless communication management component 620, 720, 1060, or 1286 described with reference to FIG. 6, 7, 10, or 12, or the subframe configuration identification component 635 or 735 described with reference to FIG. 6 or 7.

At block 1410, the method 1400 may include generating, based at least in part on the configuration of the downlink subframe, a CRS for the downlink subframe. For example, the method 1400 may include generating the CRS for the downlink subframe when the configuration of the downlink subframe includes at least one of: the data transmission for the UE, where the data transmission is based at least in part on the SFBC; the CRS-based CQI measurement subframe; the CRS-based eSIB; the transmission of the common search space grant in the self-scheduling mode; the transmission of the PCFICH; the transmission of the PFFICH, the transmission of the PDCCH; the transmission of the PHICH; or the transmission of the PBCH. The operation(s) at block 1310 may be performed using the wireless communication management component 620, 720, 1060, or 1286 described with reference to FIG. 6, 7, 10, or 12, or the CRS generation component 640 or 740 described with reference to FIG. 6 or 7.

At block 1415, the method 1400 may include signaling a presence of the CRS in the downlink subframe. In some examples, signaling the presence of the CRS may include signaling the presence of the CRS in DCI included in a PDCCH or an ePDCCH on a carrier, where the signaling may be transmitted on a different carrier than the PDCCH/ePDCCH carrier. In some cases the signaling of the presence of the CRS may be transmitted on licensed carrier or an unlicensed carrier. When cross-carrier scheduling is used, one bit of DCI included in a PDCCH/ePDCCH may be used to signal the presence of the CRS. When self-scheduling is used, one bit of DCI included in an ePDCCH may be used to signal the presence of the CRS. The DCI may be decoded by a UE prior to decoding the CRS. The operation(s) at block 1415 may be performed using the wireless communication management component 620, 720, 1060, or 1286 described with reference to FIG. 6, 7, 10, or 12, or the CRS signaling component 745 described with reference to FIG. 7.

Thus, the method 1400 may provide for wireless communication. It should be noted that the method 1400 is just one implementation and that the operations of the method 1400 may be rearranged or otherwise modified such that other implementations are possible.

Figure 15:
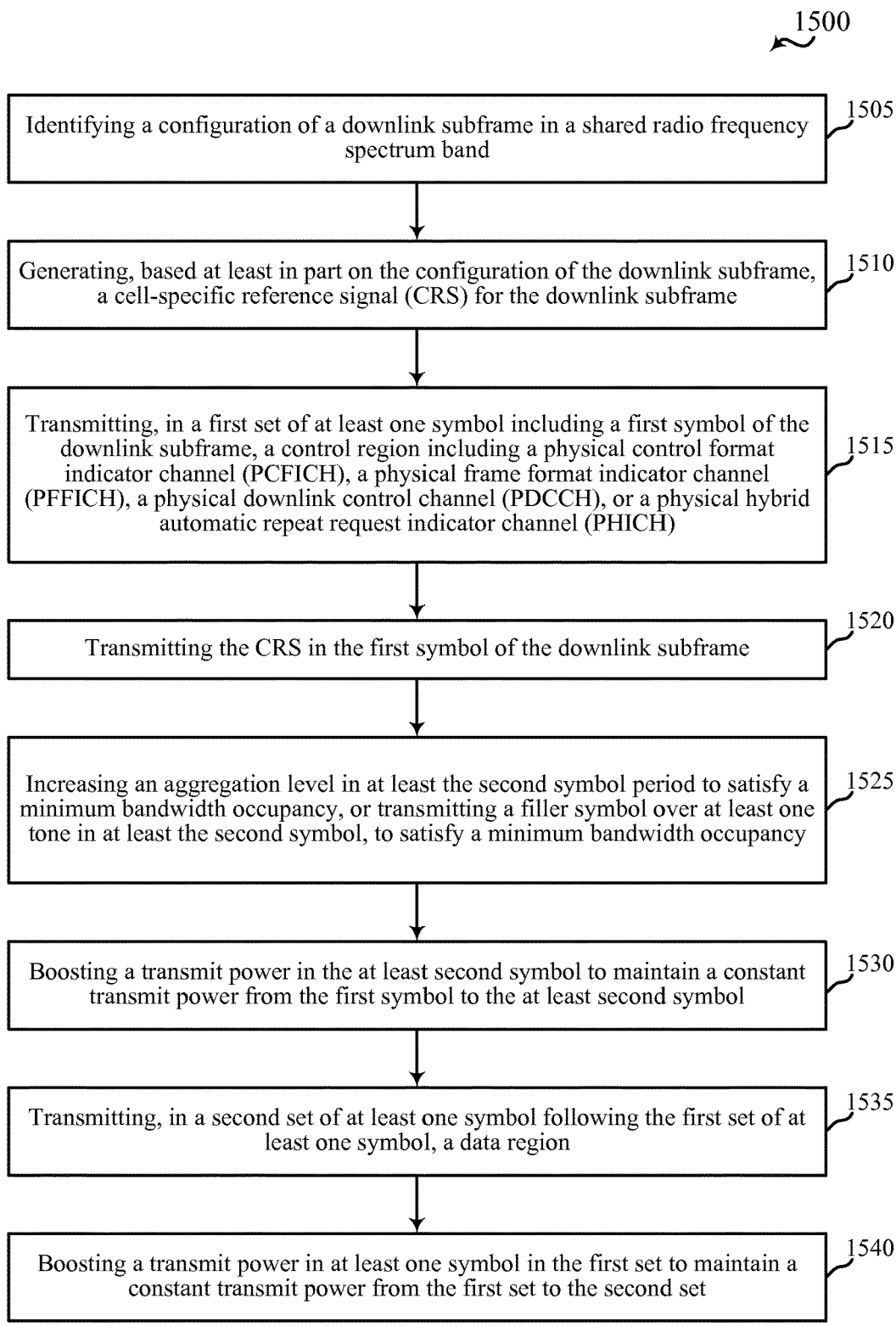
FIG. 15 is a flow chart illustrating an exemplary method for wireless communication, in accordance with various aspects of the present disclosure.

FIG. 15 is a flow chart illustrating an exemplary method 1500 for wireless communication, in accordance with various aspects of the present disclosure. For clarity, the method 1500 is described below with reference to aspects of one or more of the base stations 105, 205, 205-a, 1005, or 1205 described with reference to FIG. 1, 2, 10, or 12, or aspects of one or more of the apparatuses 605 or 705 described with reference to FIG. 6 or 7. In some examples, a base station or apparatus may execute one or more sets of codes to control the functional elements of the base station or apparatus to perform the functions described below. Additionally or alternatively, the base station or apparatus may perform one or more of the functions described below using special-purpose hardware.

At block 1505, the method 1500 may include identifying a configuration of a downlink subframe in a shared radio frequency spectrum band. In some examples, the downlink subframe may be configured to include at least one of: a transmission of a common search space grant in a self-scheduling mode; a transmission of a PCFICH; a transmission of a PFFICH, a transmission of a PDCCH; or a transmission of a PHICH. The downlink subframe may also be configured to include other or alternative transmissions. The shared radio frequency spectrum band may include a radio frequency spectrum band for which transmitting apparatuses may need to contend for access (e.g., a radio frequency spectrum band that is available for unlicensed use, such as Wi-Fi use, or a radio frequency spectrum band that is available for use by multiple operators in an equally shared or prioritized manner). The operation(s) at block 1505 may be performed using the wireless communication management component 620, 720, 1060, or 1286 described with reference to FIG. 6, 7, 10, or 12, or the subframe configuration identification component 635 or 735 described with reference to FIG. 6 or 7.

At block 1510, the method 1500 may include generating, based at least in part on the configuration of the downlink subframe, a CRS for the downlink subframe. For example, the method 1500 may include generating the CRS for the downlink subframe when the configuration of the downlink subframe includes at least one of: the transmission of the PCFICH; the transmission of the PFFICH, the transmission of the PDCCH; or the transmission of the PHICH. The operation(s) at block 1510 may be performed using the wireless communication management component 620, 720, 1060, or 1286 described with reference to FIG. 6, 7, 10, or 12, or the CRS generation component 640 or 740 described with reference to FIG. 6 or 7.

At block 1515, the method 1500 may include transmitting, in a first set of at least one symbol period including a first symbol period of the downlink subframe, a control region including a PCFICH, a PFFICH, a PDCCH, or a PHICH. In some examples, the first set of at least one symbol period may also include at least a second symbol period of the downlink subframe, and the control region may be further transmitted in at least the second symbol period of the downlink subframe. The at least second symbol period of the downlink subframe may follow the first symbol period of the downlink subframe. In some examples, the first symbol period of the downlink subframe may be a temporally first symbol period of the downlink subframe. The operation(s) at block 1515 may be performed using the wireless communication management component 620, 720, 1060, or 1286 described with reference to FIG. 6, 7, 10, or 12, or the transmission management component 750 or control transmission management component 755 described with reference to FIG. 7.

At block 1520, the method 1500 may include transmitting the CRS in the first symbol period of the downlink subframe. In alternative examples, the CRS may be transmitted in other symbol periods of the downlink subframe, in addition to or instead of the first symbol period of the downlink subframe. The operation(s) at block 1520 may be performed using the wireless communication management component 620, 720, 1060, or 1286 described with reference to FIG. 6, 7, 10, or 12, or the transmission management component 750 or CRS transmission management component 760 described with reference to FIG. 7.

In examples of the method 1500 in which the control region is transmitted in the first symbol period of the downlink subframe and at least the second symbol period, and at block 1525, the method 1500 may include increasing an aggregation level in at least the second symbol period, or transmitting a filler symbol over at least one tone in at least the second symbol period, to satisfy a minimum bandwidth occupancy. In some examples, the filler symbol may include a symbol that is decodable or usable by a UE. In other examples, the filler symbol may include a junk symbol that is not decodable or not usable by a UE. The operation(s) at block 1525 may be performed using the wireless communication management component 620, 720, 1060, or 1286 described with reference to FIG. 6, 7, 10, or 12, or the transmission management component 750 or time and frequency resource selection component 770 described with reference to FIG. 7.

In examples of the method 1500 in which the control region is transmitted in the first symbol period of the downlink subframe and at least the second symbol period, and at block 1530, the method 1500 may include boosting a transmit power in at least the second symbol period to maintain a constant transmit power from the first symbol period to the at least second symbol period. In some examples, boosting the transmit power may include transmitting a filler symbol over at least one tone in at least the second symbol period. In some examples, the transmit power in at least the second symbol period may be boosted because the CRS is transmitted in the first symbol period of the downlink subframe but not in at least the second symbol period of the downlink subframe. The operation(s) at block 1530 may be performed using the wireless communication management component 620, 720, 1060, or 1286 described with reference to FIG. 6, 7, 10, or 12, or the power adjustment component 775 described with reference to FIG. 7.

At block 1535, the method 1500 may include transmitting, in a second set of at least one symbol period following the first set of at least one symbol period, a data region. The operation(s) at block 1535 may be performed using the wireless communication management component 620, 720, 1060, or 1286 described with reference to FIG. 6, 7, 10, or 12, or the transmission management component 750 or data transmission management component 765 described with reference to FIG. 7.

At block 1540, the method 1500 may include boosting a transmit power in at least one symbol period in the first set to maintain a constant transmit power from the first set to the second set. In some examples, boosting the transmit power may include transmitting a filler symbol over at least one tone in the at least one symbol period in the first. The operation(s) at block 1540 may be performed using the wireless communication management component 620, 720, 1060, or 1286 described with reference to FIG. 6, 7, 10, or 12, or the power adjustment component 775 described with reference to FIG. 7.

Thus, the method 1500 may provide for wireless communication. It should be noted that the method 1500 is just one implementation and that the operations of the method 1500 may be rearranged or otherwise modified such that other implementations are possible.

Figure 16:
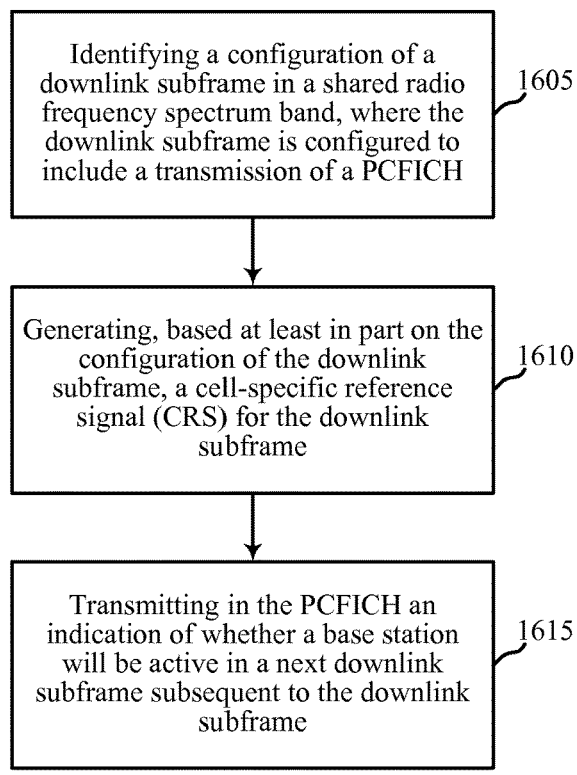
FIG. 16 is a flow chart illustrating an exemplary method for wireless communication, in accordance with various aspects of the present disclosure.

FIG. 16 is a flow chart illustrating an exemplary method 1600 for wireless communication, in accordance with various aspects of the present disclosure. For clarity, the method 1600 is described below with reference to aspects of one or more of the base stations 105, 205, **205-*a*, 1005, or 1205 described with reference to FIG. 1, 2, 10, or 12, or aspects of one or more of the apparatuses 605 or 705 described with reference to FIG. 6 or 7**. In some examples, a base station or apparatus may execute one or more sets of codes to control the functional elements of the base station or apparatus to perform the functions described below. Additionally or alternatively, the base station or apparatus may perform one or more of the functions described below using special-purpose hardware.

At block 1605, the method 1600 may include identifying a configuration of a downlink subframe in a shared radio frequency spectrum band. In some examples, the downlink subframe may be configured to include a transmission of a PCFICH. The downlink subframe may also be configured to include other or alternative transmissions. The shared radio frequency spectrum band may include a radio frequency spectrum band for which transmitting apparatuses may need to contend for access (e.g., a radio frequency spectrum band that is available for unlicensed use, such as Wi-Fi use, or a radio frequency spectrum band that is available for use by multiple operators in an equally shared or prioritized manner). The operation(s) at block 1605 may be performed using the wireless communication management component 620, 720, 1060, or 1286 described with reference to FIG. 6, 7, 10, or 12, or the subframe configuration identification component 635 or 735 described with reference to FIG. 6 or 7.

At block 1610, the method 1600 may include generating, based at least in part on the configuration of the downlink subframe, a CRS for the downlink subframe. For example, the method 1600 may include generating the CRS for the downlink subframe when the configuration of the downlink subframe includes the transmission of the PCFICH. The operation(s) at block 1610 may be performed using the wireless communication management component 620, 720, 1060, or 1286 described with reference to FIG. 6, 7, 10, or 12, or the CRS generation component 640 or 740 described with reference to FIG. 6 or 7.

At block 1615, the method 1600 may include transmitting in the PCFICH an indication of whether a base station will be active in a next downlink subframe subsequent to the downlink subframe. In some examples, the indication may include one extra bit in the PCFICH. The operations at block 1615 may be performed using the wireless communication management component 620, 720, 1060, or 1286 described with reference to FIG. 6, 7, 10, or 12, or the transmission management component 750 or control transmission management component 755 described with reference to FIG. 7.

Thus, the method 1600 may provide for wireless communication. It should be noted that the method 1600 is just one implementation and that the operations of the method 1600 may be rearranged or otherwise modified such that other implementations are possible.

Figure 17:
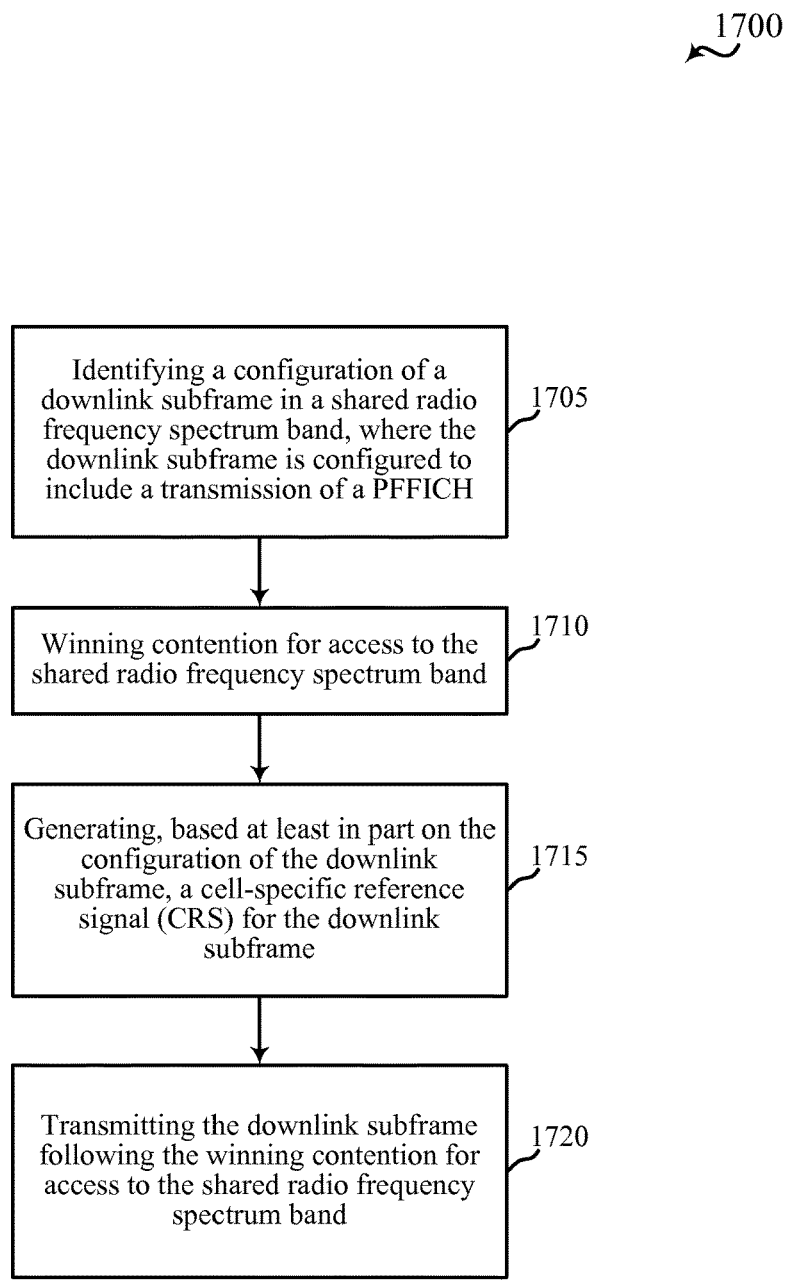
FIG. 17 is a flow chart illustrating an exemplary method for wireless communication, in accordance with various aspects of the present disclosure.

FIG. 17 is a flow chart illustrating an exemplary method 1700 for wireless communication, in accordance with various aspects of the present disclosure. For clarity, the method 1700 is described below with reference to aspects of one or more of the base stations 105, 205, 205-a, 1005, or 1205 described with reference to FIG. 1, 2, 10, or 12, or aspects of one or more of the apparatuses 605 or 705 described with reference to FIG. 6 or 7. In some examples, a base station or apparatus may execute one or more sets of codes to control the functional elements of the base station or apparatus to perform the functions described below. Additionally or alternatively, the base station or apparatus may perform one or more of the functions described below using special-purpose hardware.

At block 1705, the method 1700 may include identifying a configuration of a downlink subframe in a shared radio frequency spectrum band. In some examples, the downlink subframe may be configured to include a transmission of a PFFICH. The downlink subframe may also be configured to include other or alternative transmissions. The shared radio frequency spectrum band may include a radio frequency spectrum band for which transmitting apparatuses may need to contend for access (e.g., a radio frequency spectrum band that is available for unlicensed use, such as Wi-Fi use, or a radio frequency spectrum band that is available for use by multiple operators in an equally shared or prioritized manner). The operation(s) at block 1705 may be performed using the wireless communication management component 620, 720, 1060, or 1286 described with reference to FIG. 6, 7, 10, or 12, or the subframe configuration identification component 635 or 735 described with reference to FIG. 6 or 7.

At block 1710, the method 1700 may include winning contention for access to the shared radio frequency spectrum band. The operation(s) at block 1710 may be performed using the wireless communication management component 620, 720, 1060, or 1286 described with reference to FIG. 6, 7, 10, or 12, or the CCA component 780 described with reference to FIG. 7.

At block 1715, the method 1700 may include generating, based at least in part on the configuration of the downlink subframe, a CRS for the downlink subframe. For example, the method 1700 may include generating the CRS for the downlink subframe when the configuration of the downlink subframe includes the transmission of the PFFICH. The operation(s) at block 1715 may be performed using the wireless communication management component 620, 720, 1060, or 1286 described with reference to FIG. 6, 7, 10, or 12, or the CRS generation component 640 or 740 described with reference to FIG. 6 or 7.

At block 1720, the method 1700 may include transmitting the downlink subframe, including the PFFICH, following the winning contention for access to the shared radio frequency spectrum band. The operations at block 1720 may be performed using the wireless communication management component 620, 720, 1060, or 1286 described with reference to FIG. 6, 7, 10, or 12, or the transmission management component 750 or control transmission management component 755 described with reference to FIG. 7.

Thus, the method 1700 may provide for wireless communication. It should be noted that the method 1700 is just one implementation and that the operations of the method 1700 may be rearranged or otherwise modified such that other implementations are possible.

Figure 18:
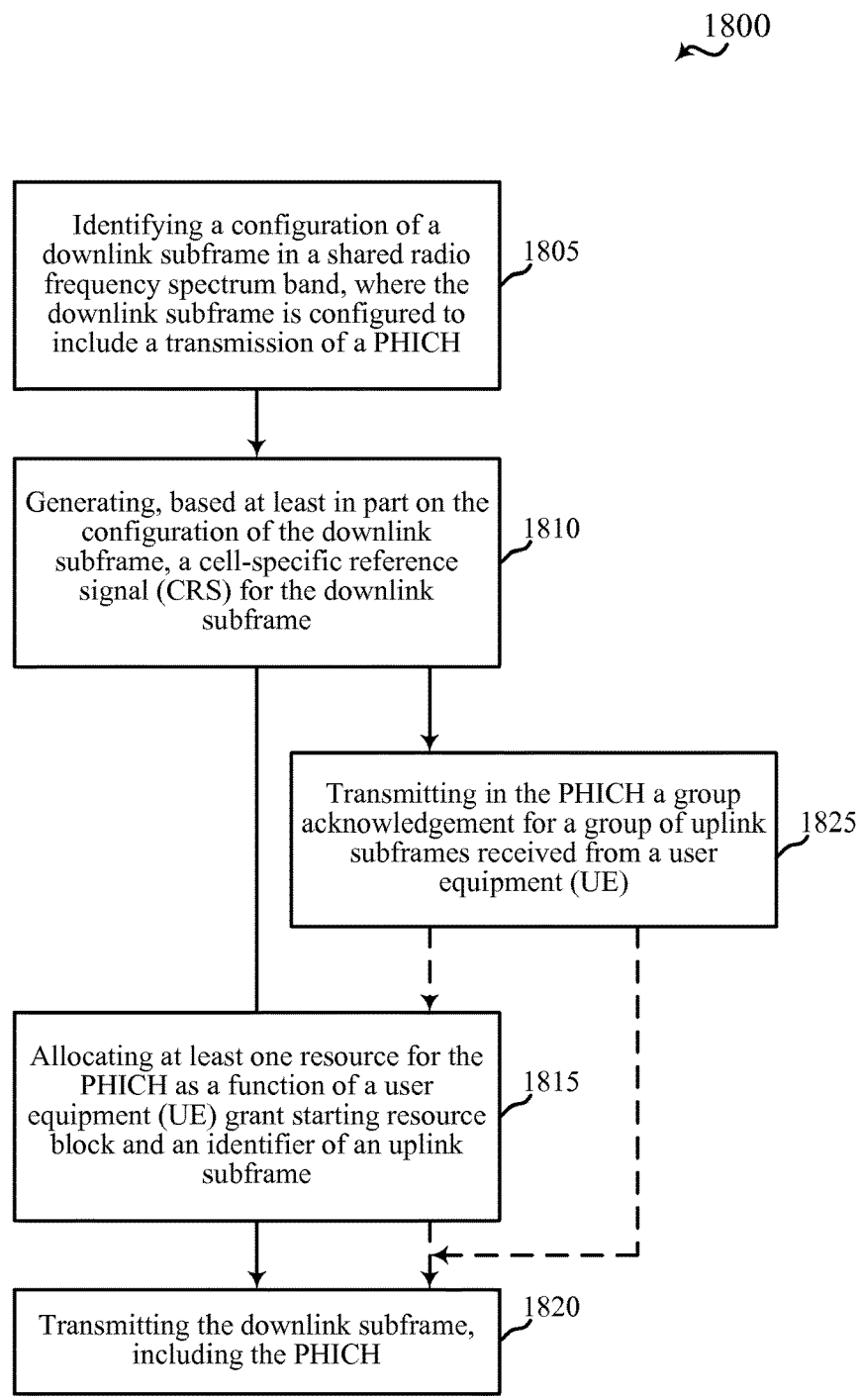
FIG. 18 is a flow chart illustrating an exemplary method for wireless communication, in accordance with various aspects of the present disclosure.

FIG. 18 is a flow chart illustrating an exemplary method 1800 for wireless communication, in accordance with various aspects of the present disclosure. For clarity, the method 1800 is described below with reference to aspects of one or more of the base stations 105, 205, 205-a, 1005, or 1205 described with reference to FIG. 1, 2, 10, or 12, or aspects of one or more of the apparatuses 605 or 705 described with reference to FIG. 6 or 7. In some examples, a base station or apparatus may execute one or more sets of codes to control the functional elements of the base station or apparatus to perform the functions described below. Additionally or alternatively, the base station or apparatus may perform one or more of the functions described below using special-purpose hardware.

At block 1805, the method 1800 may include identifying a configuration of a downlink subframe in a shared radio frequency spectrum band. In some examples, the downlink subframe may be configured to include a transmission of a PHICH. The downlink subframe may also be configured to include other or alternative transmissions. The shared radio frequency spectrum band may include a radio frequency spectrum band for which transmitting apparatuses may need to contend for access (e.g., a radio frequency spectrum band that is available for unlicensed use, such as Wi-Fi use, or a radio frequency spectrum band that is available for use by multiple operators in an equally shared or prioritized manner). The operation(s) at block 1805 may be performed using the wireless communication management component 620, 720, 1060, or 1286 described with reference to FIG. 6, 7, 10, or 12, or the subframe configuration identification component 635 or 735 described with reference to FIG. 6 or 7.

At block 1810, the method 1800 may include generating, based at least in part on the configuration of the downlink subframe, a CRS for the downlink subframe. For example, the method 1800 may include generating the CRS for the downlink subframe when the configuration of the downlink subframe includes the transmission of the PHICH. The operation(s) at block 1815 may be performed using the wireless communication management component 620, 720, 1060, or 1286 described with reference to FIG. 6, 7, 10, or 12, or the CRS generation component 640 or 740 described with reference to FIG. 6 or 7.

In some examples, the method 1800 may be variously configured to perform the operations at one or both of block 1815, block 1820, or block 1825. At block 1815, the method 1800 may include allocating at least one resource for the PHICH as a function of a UE grant starting resource block and an identifier of an uplink subframe. At block 1820, the method 1800 may include transmitting the downlink subframe, including the PHICH.

At block 1825, the method 1800 may include transmitting in the PHICH a group acknowledgement for a group of uplink subframes received from a UE. In some examples, the group acknowledgement may be transmitted with a set of CRC bits. In some examples, the method 1800 may continue, after performing the operation(s) at block 1825, at block 1815 or 1820. In some examples, the downlink subframe may be a first downlink subframe (where "first" means one of many, and not necessarily the first in time), the PHICH may be a first PHICH, and the group acknowledgement may be a first group acknowledgement for a first group of uplink subframes received from a first UE. In these latter examples, the method 1800 may include transmitting a second PHICH in a second downlink subframe. The second PHICH may include a second group acknowledgement for a second group of uplink subframes received from a second UE. The first group acknowledgement and the second group acknowledgement may be transmitted in different downlink subframes (e.g., the first downlink subframe or the second downlink subframe) because the first group of uplink subframes is received for a different TDD frame structure than the second group of uplink subframes. Stated differently, the downlink subframe in which a group acknowledgement is transmitted may be based at least in part on the TDD frame structure of the group of uplink subframes to which the group acknowledgement corresponds.

The operations at block 1815, 1820, or 1825 may be performed using the wireless communication management component 620, 720, 1060, or 1286 described with reference to FIG. 6, 7, 10, or 12, or the transmission management component 750 or control transmission management component 755 described with reference to FIG. 7.

Thus, the method 1800 may provide for wireless communication. It should be noted that the method 1800 is just one implementation and that the operations of the method 1800 may be rearranged or otherwise modified such that other implementations are possible.

In some examples, operation(s) of the methods 1300, 1400, 1500, 1600, 1700, or 1800 described with reference to FIG. 13, 14, 15, 16, 17, or 18 may be combined.

Figure 19:
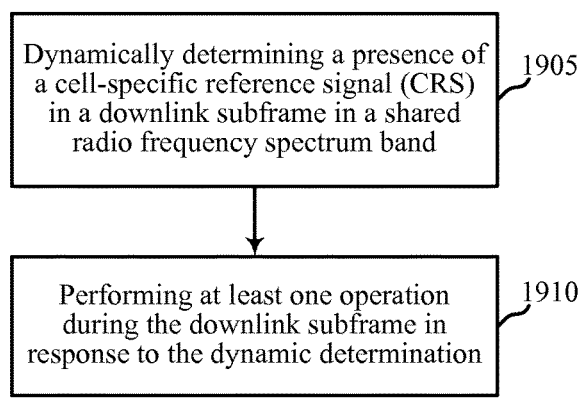
FIG. 19 is a flow chart illustrating an exemplary method for wireless communication, in accordance with various aspects of the present disclosure.

FIG. 19 is a flow chart illustrating an exemplary method 1900 for wireless communication, in accordance with various aspects of the present disclosure. For clarity, the method 1900 is described below with reference to aspects of one or more of the UEs 115, 215, 215-*a*, 215-*b*, 215-*c*, 1115, or 1215 described with reference to FIG. 1, 2, 11, or 12, or aspects of one or more of the apparatuses 815 or 915 described with reference to FIG. 8 or 9. In some examples, a UE or apparatus may execute one or more sets of codes to control the functional elements of the UE or apparatus to perform the functions described below. Additionally or alternatively, the UE or apparatus may perform one or more of the functions described below using special-purpose hardware.

At block 1905, the method 1900 may include dynamically determining a presence of a CRS in a downlink subframe in a shared radio frequency spectrum band. The shared radio frequency spectrum band may include a radio frequency spectrum band for which transmitting apparatuses may need to contend for access (e.g., a radio frequency spectrum band that is available for unlicensed use, such as Wi-Fi use, or a radio frequency spectrum band that is available for use by multiple operators in an equally shared or prioritized manner). The operation(s) at block 1905 may be performed using the wireless communication management component 820, 920, 1160, or 1284 described with reference to FIG. 8, 9, 11, or 12, or the CRS identification component 835 or 935 described with reference to FIG. 8 or 9.

At block 1910, the method 1900 may include performing at least one operation during the downlink subframe in response to the dynamic determination. The operation(s) at block 1910 may be performed using the wireless communication management component 820, 920, 1160, or 1284 described with reference to FIG. 8, 9, 11, or 12, or the CRS-based operation management component 840 or 940 described with reference to FIG. 8 or 9.

Thus, the method 1900 may provide for wireless communication. It should be noted that the method 1900 is just one implementation and that the operations of the method 1900 may be rearranged or otherwise modified such that other implementations are possible.

Figure 20:
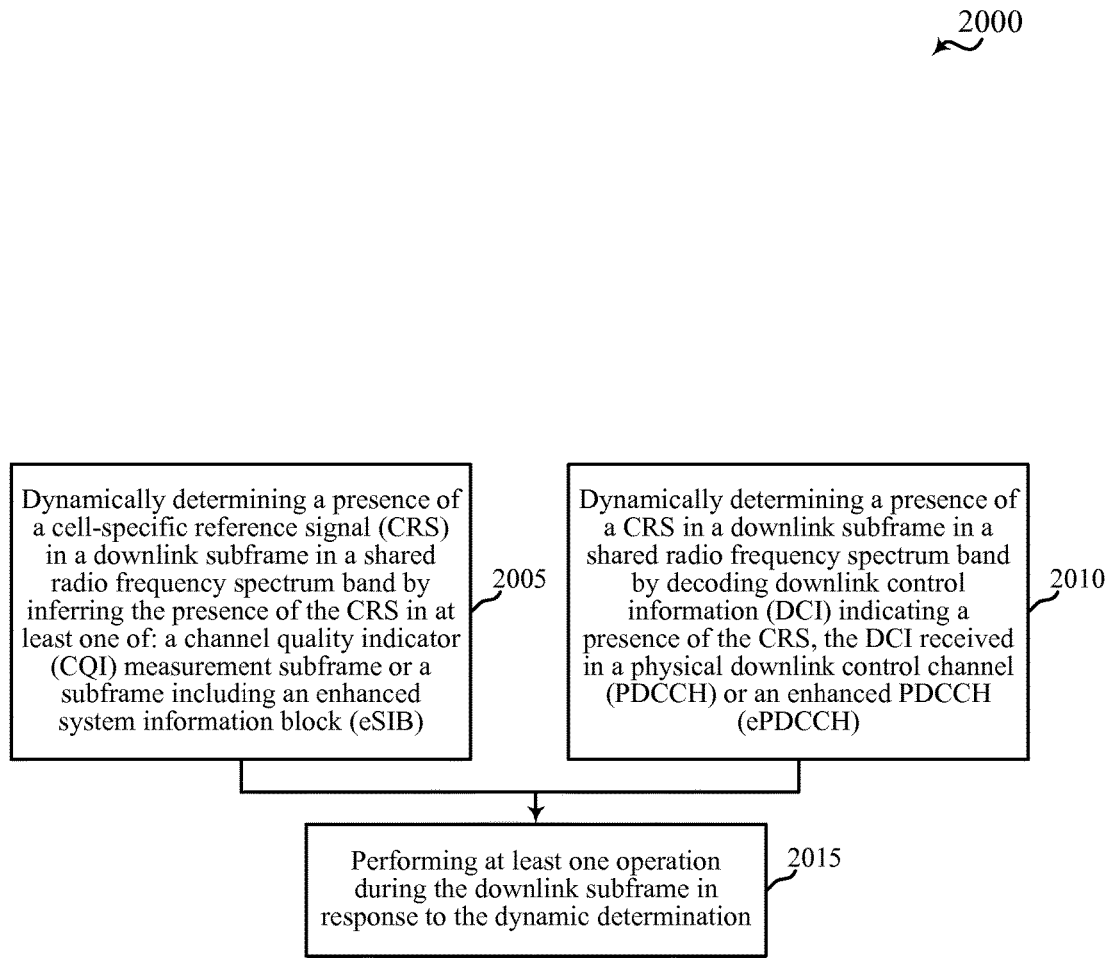
FIG. 20 is a flow chart illustrating an exemplary method for wireless communication, in accordance with various aspects of the present disclosure.

FIG. 20 is a flow chart illustrating an exemplary method 2000 for wireless communication, in accordance with various aspects of the present disclosure. For clarity, the method 2000 is described below with reference to aspects of one or more of the UEs 115, 215, 215-*a*, 215-*b*, 215-*c*, 1115, or 1215 described with reference to FIG. 1, 2, 11, or 12, or aspects of one or more of the apparatuses 815 or 915 described with reference to FIG. 8 or 9. In some examples, a UE or apparatus may execute one or more sets of codes to control the functional elements of the UE or apparatus to perform the functions described below. Additionally or alternatively, the UE or apparatus may perform one or more of the functions described below using special-purpose hardware.

The method 2000 may begin at one of block 2005 or block 2010. At block 2005, the method 2000 may include dynamically determining a presence of a CRS in a downlink subframe in a shared radio frequency spectrum band by inferring the presence of the CRS in at least one of: a CQI measurement subframe or a subframe including an eSIB. In some examples, the subframe including the eSIB may be a D-CET subframe, or the eSIB may be one of a plurality of eSIBs received on a periodic basis. At block 2010, the method 2000 may include dynamically determining a presence of a CRS in a downlink subframe in the shared radio frequency spectrum band by decoding DCI received in a PDCCH or an ePDCCH. When cross-carrier scheduling is used, decoding the DCI may include decoding one bit of DCI included in a PDCCH/ePDCCH. When self-scheduling is used, decoding the DCI may include decoding one bit of DCI included in an ePDCCH. The DCI may be decoded by a UE prior to decoding the CRS.

The shared radio frequency spectrum band may include a radio frequency spectrum band for which transmitting apparatuses may need to contend for access (e.g., a radio frequency spectrum band that is available for unlicensed use, such as Wi-Fi use, or a radio frequency spectrum band that is available for use by multiple operators in an equally shared or prioritized manner). The operation(s) at block 2005 may be performed using the wireless communication management component 820, 920, 1160, or 1284 described with reference to FIG. 8, 9, 11, or 12, the CRS identification component 835 or 935 described with reference to FIG. 8 or 9, or the inference component 945 or DCI decoding component 950 described with reference to FIG. 9.

At block 2015, the method 2000 may include performing at least one operation during the downlink subframe in response to the dynamic determination at block 2005 or block 2010. The operation(s) at block 2015 may be performed using the wireless communication management component 820, 920, 1160, or 1284 described with reference to FIG. 8, 9, 11, or 12, or the CRS-based operation management component 840 or 940 described with reference to FIG. 8 or 9.

Thus, the method 2000 may provide for wireless communication. It should be noted that the method 2000 is just one implementation and that the operations of the method 2000 may be rearranged or otherwise modified such that other implementations are possible.

Figure 21:
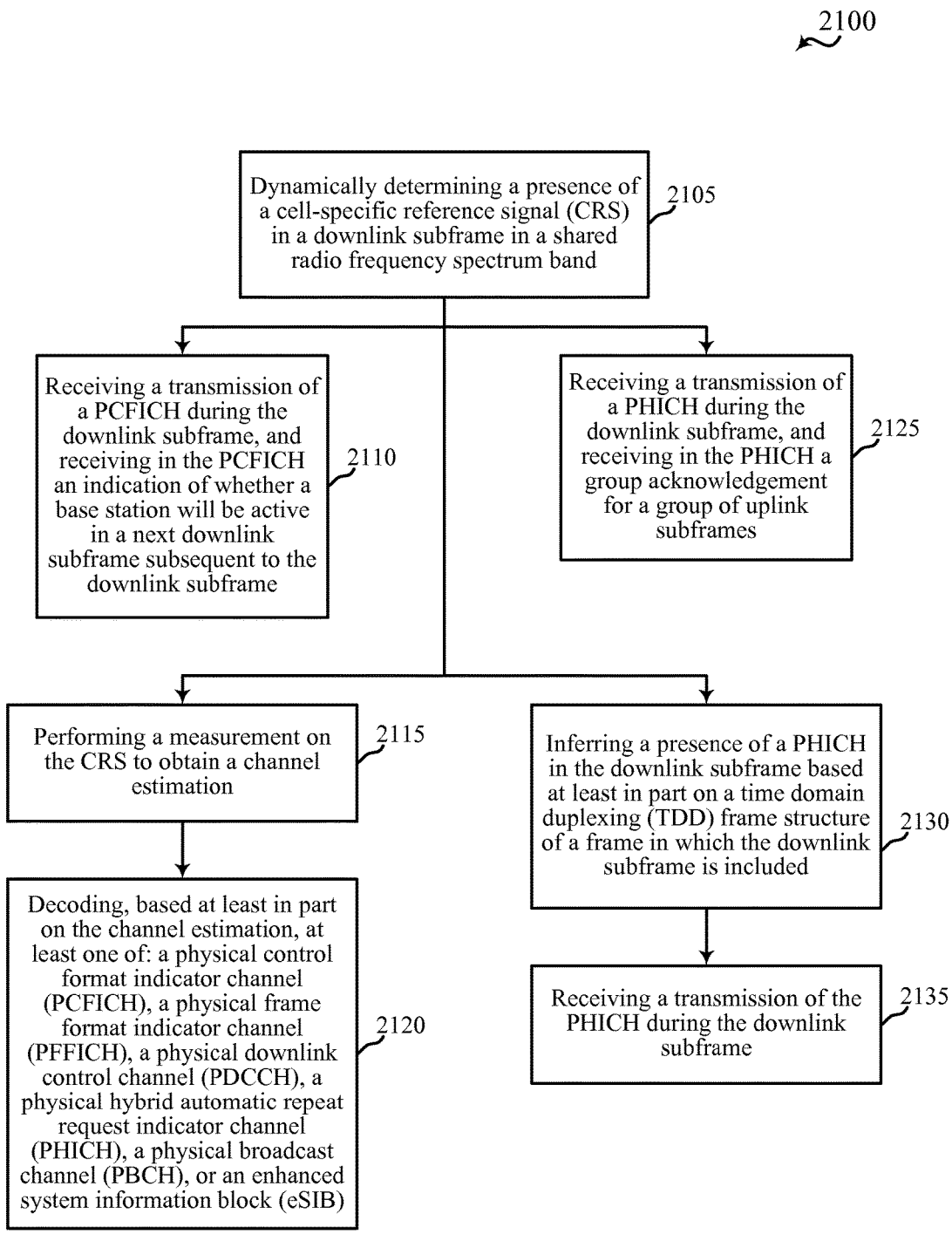
FIG. 21 is a flow chart illustrating an exemplary method for wireless communication, in accordance with various aspects of the present disclosure.

FIG. 21 is a flow chart illustrating an exemplary method 2100 for wireless communication, in accordance with various aspects of the present disclosure. For clarity, the method 2100 is described below with reference to aspects of one or more of the UEs 115, 215, 215-a, 215-b, 215-c, 1115, or 1215 described with reference to FIG. 1, 2, 11, or 12, or aspects of one or more of the apparatuses 815 or 915 described with reference to FIG. 8 or 9. In some examples, a UE or apparatus may execute one or more sets of codes to control the functional elements of the UE or apparatus to perform the functions described below. Additionally or alternatively, the UE or apparatus may perform one or more of the functions described below using special-purpose hardware.

At block 2105, the method 2100 may include dynamically determining a presence of a CRS in a downlink subframe in a shared radio frequency spectrum band. The shared radio frequency spectrum band may include a radio frequency spectrum band for which transmitting apparatuses may need to contend for access (e.g., a radio frequency spectrum band that is available for unlicensed use, such as Wi-Fi use, or a radio frequency spectrum band that is available for use by multiple operators in an equally shared or prioritized manner). The operation(s) at block 2105 may be performed using the wireless communication management component 820, 920, 1160, or 1284 described with reference to FIG. 8, 9, 11, or 12, or the CRS identification component 835 or 935 described with reference to FIG. 8 or 9.

At block 2110, block 2115, block 2120, block 2125, or block 2135, the method 2100 may include performing at least one operation during the downlink subframe in response to the dynamic determination. At block 2110, the method 2100 may include receiving a PCFICH, and receiving in the PCFICH an indication of whether a base station will be active in a next downlink subframe subsequent to the downlink subframe. The operation(s) at block 2110 may be performed using the wireless communication management component 820, 920, 1160, or 1284 described with reference to FIG. 8, 9, 11, or 12, the CRS-based operation management component 840 or 940 described with reference to FIG. 8 or 9, or the CRS-based decoding component 960 described with reference to FIG. 9.

At block 2115, the method 2100 may include performing a measurement on the CRS to obtain a channel estimation. At block 2120, the method 2100 may include decoding, based at least in part on the channel estimation, at least one of: a PCFICH, a PFFICH, a PDCCH, a PHICH, a PBCH, or an eSIB. In some examples, the eSIB may be included in a D-CET subframe, or the eSIB may be one of a plurality of eSIBs received on a periodic basis. The operation(s) at block 2115 may be performed using the wireless communication management component 820, 920, 1160, or 1284 described with reference to FIG. 8, 9, 11, or 12, the CRS-based operation management component 840 or 940 described with reference to FIG. 8 or 9, or the channel estimation management component 955. The operation(s) at block 2120 may be performed using the wireless communication management component 820, 920, 1160, or 1284 described with reference to FIG. 8, 9, 11, or 12, the CRS-based operation management component 840 or 940 described with reference to FIG. 8 or 9, or the CRS-based decoding component 960 described with reference to FIG. 9.

At block 2125, the method 2100 may include receiving a PHICH, and receiving in the PHICH a group acknowledgement for a group of uplink subframes. In some examples, a group acknowledgement may be received with a set of CRC bits. The operation(s) at block 2125 may be performed using the wireless communication management component 820, 920, 1160, or 1284 described with reference to FIG. 8, 9, 11, or 12, the CRS-based operation management component 840 or 940 described with reference to FIG. 8 or 9, or the CRS-based decoding component 960 described with reference to FIG. 9.

At block 2130, the method 2100 may include inferring a presence of a PHICH in the downlink subframe based at least in part on a TDD frame structure of a frame in which the downlink subframe is included. At block 2135, the method 2100 may include receiving a transmission of the PHICH during the downlink subframe. The operations at block 2130 or 2135 may be performed using the wireless communication management component 820, 920, 1160, or 1284 described with reference to FIG. 8, 9, 11, or 12, the CRS-based operation management component 840 or 940 described with reference to FIG. 8 or 9, or the CRS-based decoding component 960 described with reference to FIG. 9.

Thus, the method 2100 may provide for wireless communication. It should be noted that the method 2100 is just one implementation and that the operations of the method 2100 may be rearranged or otherwise modified such that other implementations are possible.

In some examples, operation(s) of the methods 1900, 2000, or 2100 described with reference to FIG. 19, 20, or 21 may be combined.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication, comprising:
   identifying a configuration of a downlink subframe in a shared radio frequency spectrum band for which wireless devices contend for access, wherein the downlink subframe includes a control region comprising a first set of symbol periods;
   determining whether to generate a cell-specific reference signal (CRS) for the downlink subframe based at least in part on the configuration of the downlink subframe;
   generating, based at least in part on the determination, the CRS for the downlink subframe;
   transmitting, in the shared radio frequency spectrum band, the CRS in a first symbol period of the first set of symbol periods of the downlink subframe;

increasing an aggregation level in at least a second symbol period of the first set of symbol periods to satisfy a minimum bandwidth occupancy; and transmitting one or more physical channels in at least the second symbol period of the downlink subframe, wherein the one or more physical channels are dependent on the transmission of the CRS.

2. The method of claim 1, further comprising:

signaling a presence of the CRS in the downlink subframe.

3. The method of claim 2, wherein signaling the presence of the CRS comprises:

signaling the presence of the CRS in downlink control information (DCI) included in a physical downlink control channel (PDCCH) or an enhanced PDCCH (ePDCCH) on a first carrier; and transmitting the signaling on a licensed carrier or an unlicensed carrier, wherein the licensed carrier and the unlicensed carrier are different from the first carrier.

4. The method of claim 1, further comprising:

transmitting, in the first set of symbol periods comprising the first symbol period of the downlink subframe, the control region comprising a physical control format indicator channel (PCFICH), a physical frame format indicator channel (PFFICH), a physical downlink control channel (PDCCH), or a physical hybrid automatic repeat request indicator channel (PHICH).

5. The method of claim 1, further comprising:

transmitting a filler symbol over at least one tone in at least the second symbol period to satisfy a minimum bandwidth occupancy.

6. The method of claim 5, wherein the filler symbol comprises a junk symbol.

7. The method of claim 1, further comprising:

boosting a transmit power in at least the second symbol period to maintain a constant transmit power from the first symbol period to at least the second symbol period.

8. The method of claim 7, wherein boosting the transmit power comprises:

transmitting a filler symbol over at least one tone in at least the second symbol period.

9. The method of claim 1, further comprising:

transmitting, in a second set of symbol periods following the first set of symbol periods, a data region; and boosting a transmit power in at least one symbol period in the first set of symbol periods to maintain a constant transmit power from the first set of symbol periods to the second set of symbol periods.

10. The method of claim 1, wherein the downlink subframe comprises a transmission of a physical control format indicator channel (PCFICH), the method further comprising:

transmitting in the PCFICH an indication of whether a base station will be active in a next downlink subframe subsequent to the downlink subframe.

11. The method of claim 1, wherein the downlink subframe comprises a transmission of a physical frame format indicator channel (PFFICH), the method further comprising:

winning contention for access to the shared radio frequency spectrum band; and transmitting the downlink subframe following the winning contention for access to the shared radio frequency spectrum band.

12. The method of claim 1, wherein the downlink subframe comprises a transmission of a physical hybrid automatic repeat request indicator channel (PHICH), the method further comprising:

transmitting in the PHICH a group acknowledgement for a group of uplink subframes received from a user equipment (UE).

13. The method of claim 12, further comprising:

transmitting the group acknowledgement with a set of cyclic redundancy check (CRC) bits.

14. The method of claim 1, wherein the downlink subframe comprises a transmission of a first physical hybrid automatic repeat request indicator channel (PHICH), the method further comprising:

transmitting in the first PHICH a first group acknowledgement for a first group of uplink subframes received from a first user equipment (UE); and transmitting in a second PHICH, in a second downlink subframe, a second group acknowledgement for a second group of uplink subframes received from a second UE;

wherein the first group of uplink subframes is received for a different time domain duplexing (TDD) frame structure than the second group of uplink subframes.

15. The method of claim 1, wherein the downlink subframe comprises a transmission of a physical hybrid automatic repeat request indicator channel (PHICH), the method further comprising:

allocating at least one resource for the PHICH as a function of a user equipment (UE) grant starting resource block and an identifier of an uplink subframe.

16. The method of claim 1, wherein the downlink subframe comprises a CRS-based enhanced system information block (eSIB).

17. The method of claim 16, wherein the downlink subframe comprises a downlink clear channel assessment exempt transmission (D-CET) subframe.

18. The method of claim 16, wherein the CRS-based eSIB comprises one of a plurality of eSIBs transmitted on a periodic basis.

19. The method of claim 1, wherein the downlink subframe comprises at least one of:

a data transmission for a user equipment (UE), the data transmission based at least in part on a space frequency block coding (SFBC); a CRS-based channel quality indicator (CQI) measurement subframe; a transmission of a common search space grant in a self-scheduling mode; a transmission of a physical control format indicator channel (PCFICH); a transmission of a physical frame format indicator channel (PFFICH); a transmission of a physical downlink control channel (PDCCH); a transmission of a physical hybrid automatic repeat request indicator channel (PHICH); or a transmission of a physical broadcast channel (PBCH).

20. An apparatus for wireless communication, comprising:

a processor;

memory in electronic communication with the processor; and the processor and memory configured to:

identify a configuration of a downlink subframe in a shared radio frequency spectrum band for which wireless devices contend for access, wherein the downlink subframe includes a control region comprising a first set of symbol periods;

determine whether to generate a cell-specific reference signal (CRS) for the downlink subframe based at least in part on the configuration of the downlink subframe;

generate, based at least in part on the determination, the CRS for the downlink subframe;

transmit, in the shared radio frequency spectrum band, the CRS in a first symbol period of the first set of symbol periods of the downlink subframe;

increase an aggregation level in at least a second symbol period of the first set of symbol periods to satisfy a minimum bandwidth occupancy; and transmit one or more physical channels in at least the second symbol period of the downlink subframe, wherein the one or more physical channels are dependent on the transmission of the CRS.

21. A method for wireless communication, comprising:

receiving a downlink subframe in a shared radio frequency spectrum band for which wireless devices contend for access, wherein the downlink subframe includes a control region comprising a first set of symbol periods;

identifying a configuration of the downlink subframe;

inferring a presence of a cell-specific reference signal (CRS) in a first symbol period of the first set of symbol periods of the downlink subframe based at least in part on the identified configuration of the downlink subframe;

receiving at least a second symbol period of the first set of symbol periods, wherein at least the second symbol period has an increased aggregation level that satisfies a minimum bandwidth occupancy;

receiving one or more physical channels in at least the second symbol period of the downlink subframe, wherein the one or more physical channels are dependent on the presence of the CRS; and performing at least one operation during the downlink subframe upon inferring the presence of the CRS in the downlink subframe.

22. The method of claim 21, wherein performing the at least one operation during the downlink subframe comprises:

performing a measurement on the CRS to obtain a channel estimation; and decoding, based at least in part on the channel estimation, at least one of: a physical control format indicator channel (PCFICH), a physical frame format indicator channel (PFFICH), a physical downlink control channel (PDCCH), a physical hybrid automatic repeat request indicator channel (PHICH), or a physical broadcast channel (PBCH).

23. The method of claim 21, wherein inferring the presence of the CRS comprises at least one of:

inferring the presence of the CRS in a channel quality indicator (CQI) measurement subframe or a subframe comprising an enhanced system information block (eSIB), or decoding downlink control information (DCI) received in a physical downlink control channel (PDCCH) or an enhanced PDCCH (ePDCCH).

24. The method of claim 21, wherein performing the at least one operation during the downlink subframe comprises:

receiving a physical control format indicator channel (PCFICH); and receiving in the PCFICH an indication of whether a base station will be active in a next downlink subframe subsequent to the downlink subframe.

25. The method of claim 21, wherein performing the at least one operation during the downlink subframe comprises:

receiving a physical hybrid automatic repeat request indicator channel (PHICH); and receiving in the PHICH a group acknowledgement for a group of uplink subframes.

26. The method of claim 25, further comprising:

receiving the group acknowledgement with a set of cyclic redundancy check (CRC) bits.

27. The method of claim 21, wherein performing the at least one operation during the downlink subframe comprises:

performing a measurement on the CRS to obtain a channel estimation; and decoding, based at least in part on the channel estimation, an enhanced system information block (eSIB).

28. An apparatus for wireless communication, comprising:

a processor;

memory in electronic communication with the processor; and the processor and memory configured to:

receive a downlink subframe in a shared radio frequency spectrum band for which wireless devices contend for access, wherein the downlink subframe includes a control region comprising a first set of symbol periods;

identify a configuration of the downlink subframe;

infer a presence of a cell-specific reference signal (CRS) in a first symbol period of the first set of symbol periods of the downlink subframe based at least in part on the identified configuration of the downlink subframe;

receiving at least a second symbol period of the first set of symbol periods, wherein at least the second symbol period has an increased aggregation level that satisfies a minimum bandwidth occupancy;

receive one or more physical channels in at least the second symbol period of the downlink subframe, wherein the one or more physical channels are dependent on the presence of the CRS; and perform at least one operation during the downlink subframe upon inferring the presence of the CRS in the downlink subframe.

* * * * *